United States Patent
MacLean et al.

(10) Patent No.: US 11,350,784 B2
(45) Date of Patent: Jun. 7, 2022

(54) PUNCTURE MECHANISM FOR BEVERAGE MACHINE

(71) Applicant: BEDFORD SYSTEMS LLC, Bedford, MA (US)

(72) Inventors: Timothy MacLean, Wakefield, MA (US); Travis Nevers, Tewksbury, MA (US); Charlie O'Neill, Tewksbury, MA (US); Hallam Arthur William Collings, Cambridge (GB); George William Arthur Wells, Cambridge, MA (US); Benjamin Latham Lawson, Brookline, MA (US); Daniel Luke Coveney, Cambridge (GB); Andrew James Stratton, Royston (GB)

(73) Assignee: BEDFORD SYSTEMS LLC, Bedford, MA (US)

( * ) Notice: Subject to any disclaimer, the term of this patent is extended or adjusted under 35 U.S.C. 154(b) by 356 days.

(21) Appl. No.: 16/362,469

(22) Filed: Mar. 22, 2019

(65) Prior Publication Data
US 2019/0290053 A1    Sep. 26, 2019

Related U.S. Application Data

(60) Provisional application No. 62/646,813, filed on Mar. 22, 2018.

(51) Int. Cl.
*A47J 31/40* (2006.01)
*A47J 31/36* (2006.01)
*A47J 31/06* (2006.01)

(52) U.S. Cl.
CPC ......... *A47J 31/407* (2013.01); *A47J 31/3628* (2013.01); *A47J 31/3695* (2013.01); *A47J 31/0673* (2013.01)

(58) Field of Classification Search
CPC .. A47J 31/407; A47J 31/3695; A47J 31/3628; A47J 31/0673
See application file for complete search history.

(56) References Cited

U.S. PATENT DOCUMENTS

| 4,029,003 A | * | 6/1977 | Manaresi | ............. A47J 31/407 |
| | | | | 99/295 |
| 5,039,012 A | | 8/1991 | Inaba | |

(Continued)

FOREIGN PATENT DOCUMENTS

| EP | 2241228 A1 | 10/2010 |
| EP | 2520203 B1 | 1/2014 |

(Continued)

OTHER PUBLICATIONS

International Search Report and Written Opinion of the International Searching Authority for International Patent Application No. PCT/US2017/064343, dated Feb. 19, 2018 (11 pages).

(Continued)

*Primary Examiner* — Robert F Long
*Assistant Examiner* — Eduardo R Ferrero
(74) *Attorney, Agent, or Firm* — Dorsey & Whitney LLP

(57) ABSTRACT

Described herein includes a puncture mechanism for a beverage appliance or machine that can be configured to puncture a pod containing a beverage medium (e.g., a flavoring agent). The puncture mechanism can be configured to induce lateral movement of one or more engagement members to securely hold a beverage pod. The puncture mechanism can be configured to induce relative axial movement between an anvil and the secured beverage pod to puncture a seal of the beverage pod.

18 Claims, 14 Drawing Sheets

(56) References Cited

U.S. PATENT DOCUMENTS

| | | | |
|---|---|---|---|
| 5,188,628 A | 2/1993 | Rani et al. | |
| 5,817,082 A | 10/1998 | Niedospial et al. | |
| 6,142,063 A | 11/2000 | Beaulieu et al. | |
| 6,240,832 B1* | 6/2001 | Schmed | A47J 31/3623 221/121 |
| 6,606,938 B2 | 8/2003 | Taylor | |
| 6,644,173 B2 | 11/2003 | Lazaris et al. | |
| 7,165,488 B2 | 1/2007 | Bragg et al. | |
| 7,316,178 B2 | 1/2008 | Halliday et al. | |
| 7,827,905 B2* | 11/2010 | Bardazzi | A47J 31/368 99/289 R |
| 2003/0066431 A1 | 4/2003 | Fanzutti | A47J 31/469 99/279 |
| 2004/0231521 A1* | 11/2004 | Yoakim | A47J 31/369 99/275 |
| 2004/0250686 A1* | 12/2004 | Hale | A47J 31/369 99/295 |
| 2005/0160919 A1* | 7/2005 | Balkau | A47J 31/0673 99/279 |
| 2006/0123998 A1* | 6/2006 | Castellani | A47J 31/369 99/495 |
| 2007/0221066 A1* | 9/2007 | Sullivan | A47J 31/3695 99/279 |
| 2008/0041234 A1* | 2/2008 | Cortese | A47J 31/3628 99/290 |
| 2009/0007794 A1* | 1/2009 | Cortese | A47J 31/3628 99/289 R |
| 2009/0155422 A1* | 6/2009 | Ozanne | A47J 31/0615 426/89 |
| 2009/0308882 A1 | 12/2009 | Hundley | |
| 2010/0083843 A1* | 4/2010 | Denisart | A47J 31/3695 99/295 |
| 2010/0107889 A1* | 5/2010 | Denisart | A47J 31/3695 99/295 |
| 2010/0192779 A1* | 8/2010 | Tanner | A47J 31/407 99/295 |
| 2010/0288132 A1* | 11/2010 | Gavillet | A47J 31/369 99/295 |
| 2011/0000377 A1* | 1/2011 | Favre | A47J 31/3638 99/289 R |
| 2011/0017072 A1* | 1/2011 | Frigeri | A47J 31/3695 99/289 P |
| 2013/0142931 A1* | 6/2013 | Fin | A47J 31/3633 426/433 |
| 2013/0152797 A1* | 6/2013 | Mori | A47J 31/446 99/280 |
| 2013/0239820 A1* | 9/2013 | Baldo | A47J 31/407 99/295 |
| 2013/0276638 A1* | 10/2013 | Kristlbauer | A47J 31/407 99/295 |
| 2014/0048549 A1 | 2/2014 | Wille | |
| 2014/0076170 A1* | 3/2014 | Epars | A47J 31/46 99/295 |
| 2014/0137748 A1* | 5/2014 | Perentes | A47J 31/22 99/295 |
| 2014/0178546 A1* | 6/2014 | Besson | A47J 31/3633 426/425 |
| 2014/0212556 A1 | 7/2014 | Larzul et al. | |
| 2014/0298999 A1* | 10/2014 | Lloret Such | A47J 31/407 99/295 |
| 2014/0326144 A1* | 11/2014 | Novak | B67D 1/0406 99/323.2 |
| 2015/0017288 A1* | 1/2015 | Lo Faro | B65D 85/8043 426/112 |
| 2015/0050404 A1* | 2/2015 | Ferrier | A47J 31/36 426/425 |
| 2015/0059587 A1* | 3/2015 | Colleoni | A47J 31/407 99/295 |
| 2015/0059588 A1* | 3/2015 | Castellani | A47J 31/0673 99/295 |
| 2015/0135965 A1* | 5/2015 | Lo Foro | A47J 31/407 99/285 |
| 2015/0257580 A1* | 9/2015 | Crarer | B65D 65/466 426/425 |
| 2015/0272376 A1 | 10/2015 | Flick et al. | |
| 2016/0051080 A1* | 2/2016 | Lo Faro | A47J 31/407 99/282 |
| 2016/0068334 A1* | 3/2016 | Cafaro | B65D 77/08 426/115 |
| 2016/0174752 A1* | 6/2016 | Casiddu | A47J 31/3628 99/295 |
| 2016/0324361 A1* | 11/2016 | Van Belleghem | A47J 31/3638 |
| 2017/0127872 A1* | 5/2017 | Dumur | A47J 31/3628 |
| 2019/0016580 A1 | 1/2019 | Krüger et al. | |
| 2019/0077586 A1 | 3/2019 | Cafaro et al. | |
| 2019/0256279 A1 | 8/2019 | Mühlemann | |
| 2019/0292034 A1* | 9/2019 | Wood | B67D 1/0021 |

FOREIGN PATENT DOCUMENTS

| | | |
|---|---|---|
| WO | 2010076698 A1 | 7/2010 |
| WO | 2011094677 A2 | 8/2011 |
| WO | 2011138723 A1 | 11/2011 |
| WO | 2012146470 A1 | 11/2012 |
| WO | 2014037598 A1 | 3/2014 |
| WO | 2016040268 A2 | 3/2016 |

OTHER PUBLICATIONS

International Search Report and Written Opinion for Int'l Application No. PCT/US2019/023707 dated Jun. 26, 2019.

* cited by examiner

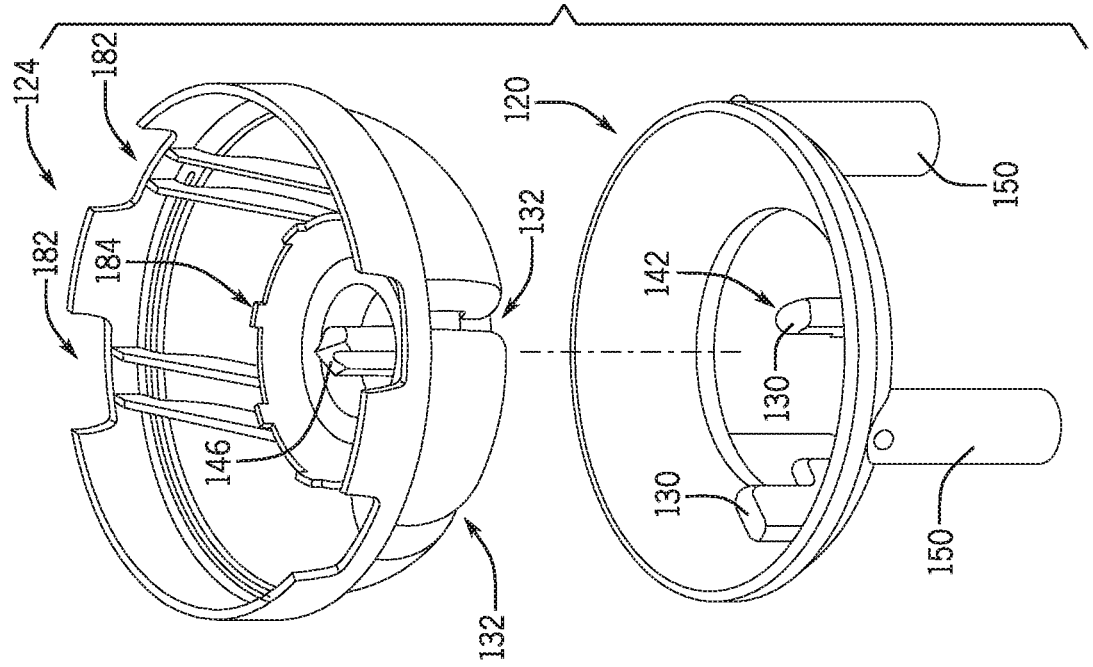
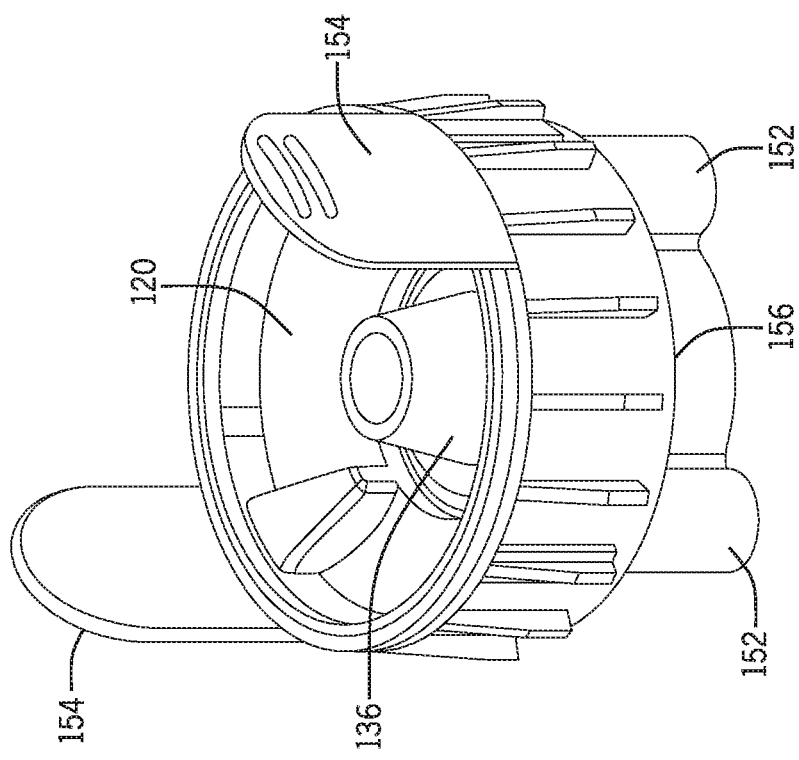
FIG. 5
FIG. 4

PUNCTURE MECHANISM FOR BEVERAGE MACHINE

CROSS-REFERENCE TO RELATED APPLICATION

The patent application is a non-provisional patent application of, and claims priority to, U.S. Provisional Application No. 62/646,813 filed Mar. 22, 2018, titled "Puncture Mechanism for Beverage Machine," the disclosure of which is hereby incorporated herein by reference in its entirety.

FIELD

The present disclosure relates generally to a beverage machine, and more particularly, to structures and techniques for manipulating a beverage cartridge held within a beverage machine.

BACKGROUND

Beverage machines generally include a puncture mechanism that penetrates a pod containing a beverage medium during preparation of a beverage. Once the pod is punctured, a liquid generally is mixed with the beverage medium to create the beverage. Puncture mechanisms are described in a wide variety of publications, including U.S. Pat. Pub. No. 2016/0106136.

SUMMARY

In various embodiments, a puncture mechanism for a beverage machine is disclosed. The puncture mechanism can be associated with a dispensing station of a beverage machine. The puncture mechanism can be configured to puncture a pod containing a beverage medium (e.g., a flavoring agent). For example, the puncture mechanism can be configured to induce lateral movement of one or more engagement members to secure a beverage pod, and the puncture mechanism can be configured to induce relative axial movement between an anvil and the beverage pod to cause a seal of the beverage pod to be punctured. In various embodiments, the anvil can contact a cap of the beverage pod to cause the seal of the pod to be punctured.

In an embodiment, a puncture mechanism for a beverage machine is disclosed. The puncture mechanism includes a first cam. The puncture mechanism further includes a first cam follower associated with the first cam and configured to move in an axial direction in response to rotation of the first cam. This causes relative axial movement between an anvil and a beverage pod. The puncture mechanism further includes a second cam. The puncture mechanism further includes a second cam follower associated with the second cam and configured to move in a lateral direction in response to rotation of the second cam. This causes engagement between a sliding lock and a beverage pod.

In another embodiment, the puncture mechanism can further include a rotatable cam driver configured to cause movement of the first cam and the second cam. The first cam can be defined by the cam driver. The first cam can include a cam path defined by the cam driver. In some cases, the cam path can be defined along a circumferential wall and extending axially to define a ramp section along the circumferential wall. In this regard, the cam path can further include a dwell section configured to cause no axial movement of the first cam follower, and the ramp section is configured to cause axial movement of the first cam follower.

In another embodiment, the second cam can be defined by the cam driver. The second cam can include a shaft. In some cases, the sliding lock can define the cam follower and the shaft is arranged within the cam follower.

In another embodiment, the puncture mechanism can further include a motor coupled to the cam driver by a gear configured to rotate the cam driver about a longitudinal axis of the puncture mechanism. The first cam follower can be arranged at a rotationally fixed position about a longitudinal axis of the puncture mechanism. In some cases, the first cam follower can include a carrier ring including a radially-extending pin that interacts with the first cam path.

In another embodiment, a puncture mechanism for a beverage machine is disclosed. The puncture mechanism can include a cam driver that is rotatable about a longitudinal axis of the puncture mechanism. The puncture mechanism can further include first and second cams defined by the cam driver. The puncture mechanism can further include first and second cam followers associated with the first and second cams, respectively. The first cam can be configured to cause the first cam follower to move axially along the longitudinal axis of the puncture mechanism. The second cam can be configured to cause the second cam follower to move transverse to the longitudinal axis of the puncture mechanism.

In another embodiment, the first cam can include a cam path defined in a sidewall of the cam driver. The first cam follower can include a carrier ring, including a radially-extending pin received in the cam path. In some cases, the second cam can include a cam surface defined by the cam driver. The second cam follower can further include at least two movable locks that are moved by the cam surface between a first position in which the locks are retracted from the longitudinal axis and a second position in which the locks are extended toward the longitudinal axis. In some cases, the cam surface can be defined by a shaft extending through a track defined by the cam follower.

In another embodiment, a method of puncturing a seal in a beverage pod in a beverage machine using a puncture mechanism is disclosed. The method includes rotating a cam driver about a longitudinal axis of the puncture mechanism. The method further includes, in response to rotating the cam driver, moving a first cam follower, associated with a first cam defined by the cam driver, axially along the longitudinal axis. This can cause relative axial movement between the beverage pod and an anvil of the puncture mechanism. The method further includes, in response to rotating the cam driver, moving a second cam follower, associated with a second cam defined by the cam driver, transverse to the longitudinal axis. This can cause the second cam follower to engage the beverage pod and restrict axial movement of the beverage pod relative to the second cam follower.

In another embodiment, the operation of moving a first cam follower can include releasing beverage medium from the beverage pod using the relative axial movement between the beverage pod and the anvil of the puncture mechanism. Additionally, the operation of rotating can include rotating the cam driver using a motor coupled to the cam driver by a gear. In some cases, the method can further include rotating the cam driver about the longitudinal axis for release of the beverage pod from the second cam follower.

This summary of the disclosure is given to aid understanding. Each of the various aspects and features of the disclosure can advantageously be used separately in some instances, or in combination with other aspects and features of the disclosure in other instances. Accordingly, while the disclosure is presented in terms of examples, individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and constitute a part of the specification, illustrate examples of the disclosure, and, together with the general description given above and the detailed description given below, serve to explain features of these examples.

FIG. 4 is an isometric view of a pod seat and anvil of the dispensing assembly of FIG. 3 in accordance with various embodiments of the present disclosure.

FIG. 5 is an isometric view of alternative alignment features of a pod seat and a pod cap in accordance with various embodiments of the present disclosure.

Figure 1:
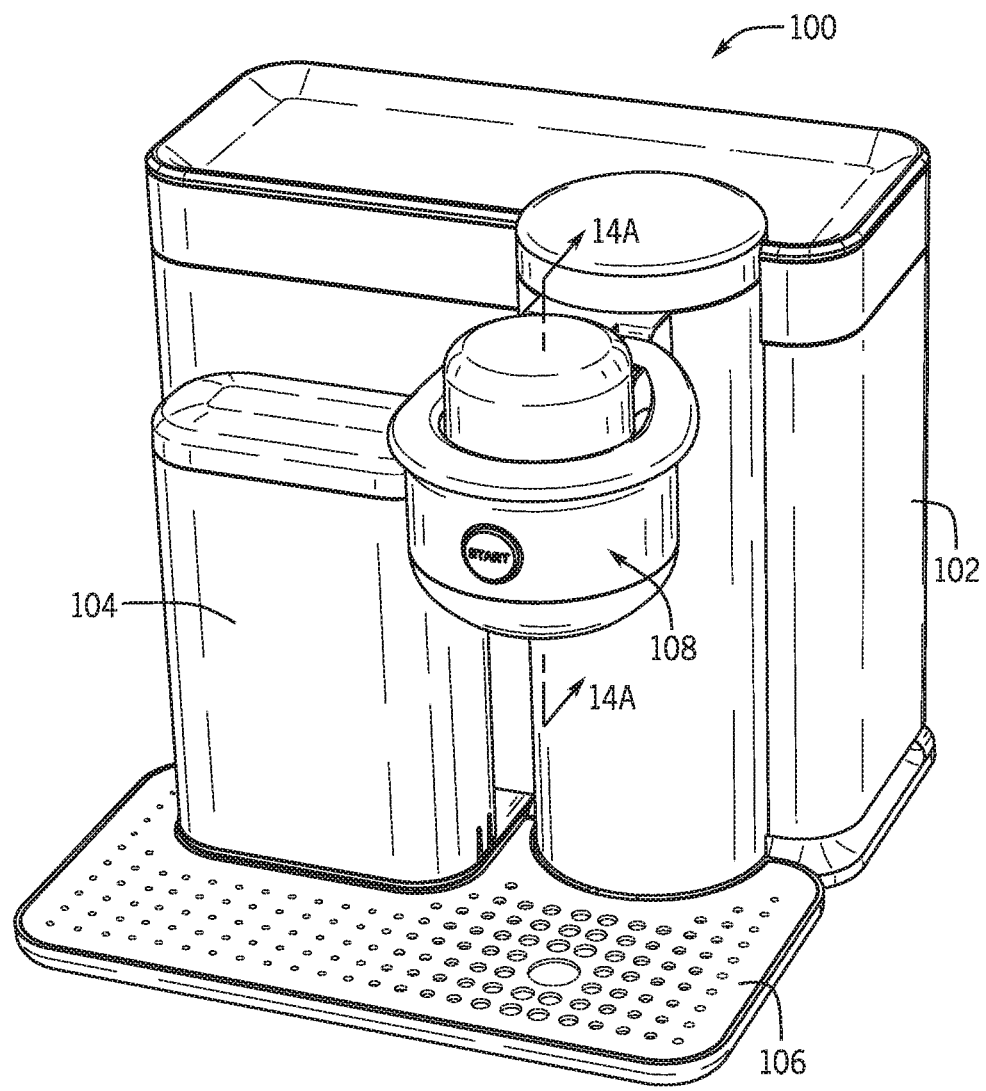
FIG. 1 is an isometric view of a beverage machine in accordance with various embodiments of the present disclosure.

The drawings are not necessarily to scale. In certain instances, details unnecessary for understanding the disclosure or rendering other details difficult to perceive have been omitted. In the appended drawings, similar components and/or features can have the same reference label. Further, various components of the same type can be distinguished by following the reference label by a letter or number that distinguishes among the similar components. If only the first reference label is used in the specification, the description is applicable to any one of the similar components having the same first reference label irrespective of the second reference label. The claimed subject matter is not necessarily limited to the particular examples or arrangements illustrated herein.

DETAILED DESCRIPTION

Various embodiments of the present disclosure are directed to a puncture mechanism for a beverage appliance or machine. The puncture mechanism can be associated with a dispensing assembly or station of the beverage and can be operable to puncture a pod containing a beverage medium (e.g., a flavoring agent, alcohol, etc.). Once the pod is punctured, the beverage medium can be mixed with a liquid to create a beverage for consumption by a user.

In various embodiments, the puncture mechanism can capture (e.g., securely hold) a beverage pod. Then, the puncture mechanism can translate at least one of an anvil or the pod toward the other of the anvil or pod such that a seal of the pod is punctured by the anvil. In various embodiments, the puncture mechanism translates the anvil toward the secured beverage pod such that a seal of the pod is punctured by the anvil. In various embodiments, the puncture mechanism translates the beverage pod toward the anvil such that a seal of the pod is punctured by the anvil.

The puncture mechanism can induce motion in multiple directions based on a single rotational input. For example, using a single rotating drive member (e.g., a rotating cam or cam driver), the puncture mechanism can induce lateral movement of one or more engagement members (e.g., locks) to secure a beverage pod, and the puncture mechanism can induce relative axial movement between an anvil and the beverage pod to puncture a seal of the pod. The puncture mechanism can include a single rotating driver, first and second cams, and first and second cam followers to secure and puncture the beverage pod. The driver can be propelled via, for example, a motor or a manual mechanism.

As the driver rotates, the cam followers can simultaneously move along their respective cams. For example, one of the cam followers (e.g., a movable lock) can move along a respective cam to cause the lock to move toward a stationary beverage pod. At the end of its travel, the lock can engage the beverage pod, such as by protruding into castellations in the cap of the pod, thereby securely holding the beverage pod. As the driver continues to rotate, the lock can move along a dwell section of the respective cam, thus having no motion such that the lock remains in engagement with the pod.

Simultaneously, another one of the cam followers (e.g., a carrier ring) can move along an associated cam. The carrier ring can initially move through a dwell section and thus have no motion. After the dwell section, the carrier ring can translate along a longitudinal direction of the puncture mechanism. The carrier ring can carry one of the anvil or the pod toward, and into contact with, the other of the anvil or the pod. The translation of the carrier ring and the associated anvil or pod can continue until the anvil causes the pod seal to be punctured. For example, the anvil can cause a needle attached to a cap of the pod to puncture the pod seal. The driver can be rotated in the opposite direction to reverse the motion of the carrier ring and the lock, thereby resetting the puncture mechanism for subsequent use.

FIG. 1 is an isometric view of a beverage appliance or machine 100 in accordance with various embodiments of the present disclosure. The beverage machine 100 can include a housing 102 that conceals or shields various components of the machine, a reservoir 104 that holds a liquid (e.g., water) used to form a beverage, and a drip tray 106 that supports a user's cup or other container for receiving a dispensed beverage. The reservoir 104 can be removable from the housing 102 such that a user can fill the reservoir 104 with a beverage precursor liquid, such as plain water, that is used to form a beverage dispensed at a dispensing station 108 into a user's container. The reservoir 104 can include a movable lid to facilitate a user in filling the reservoir 104 with the precursor liquid. In various embodiments, the reservoir 104 can be replaced by a plumbed connection to a direct or main water source. The beverage precursor liquid can be any suitable liquid, including water or any other suitable liquid used to form a beverage. The reservoir 104 or main water source can form part of a beverage precursor supply which provides a precursor liquid for conditioning of some kind (e.g., filtering, chilling, carbonating, mixing with a beverage medium, and dispensing as a beverage).

Various components of the beverage machine 100 can be located within the housing 102. For example, a pump can be located within the housing 102 and can move precursor liquid from the reservoir 104 to a conditioning system (for example, a filtration system, a chilling system, a carbonation system, etc.), where the precursor liquid can be conditioned for mixing with a beverage medium. The conditioned liquid can be moved from the conditioning system to the dispensing station 108, where the conditioned liquid can be mixed with a beverage medium (e.g., a flavoring agent), and dispensed into a user's container. The beverage medium can be contained in a sealed cartridge or pod received in the dispensing station 108. A puncture mechanism can be associated with the dispensing station 108 and can be configured to puncture the pod to provide access to the beverage medium in the pod. In various embodiments, the conditioned liquid can be mixed with the beverage medium in the pod, or the beverage medium can be removed from the pod (e.g., via pressurized gas introduced into the pod that forces the beverage medium out of the pod) for mixing with the conditioned liquid prior to dispensing into a user's container.

Control of the beverage machine 100 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage machine 100.

Figure 2:
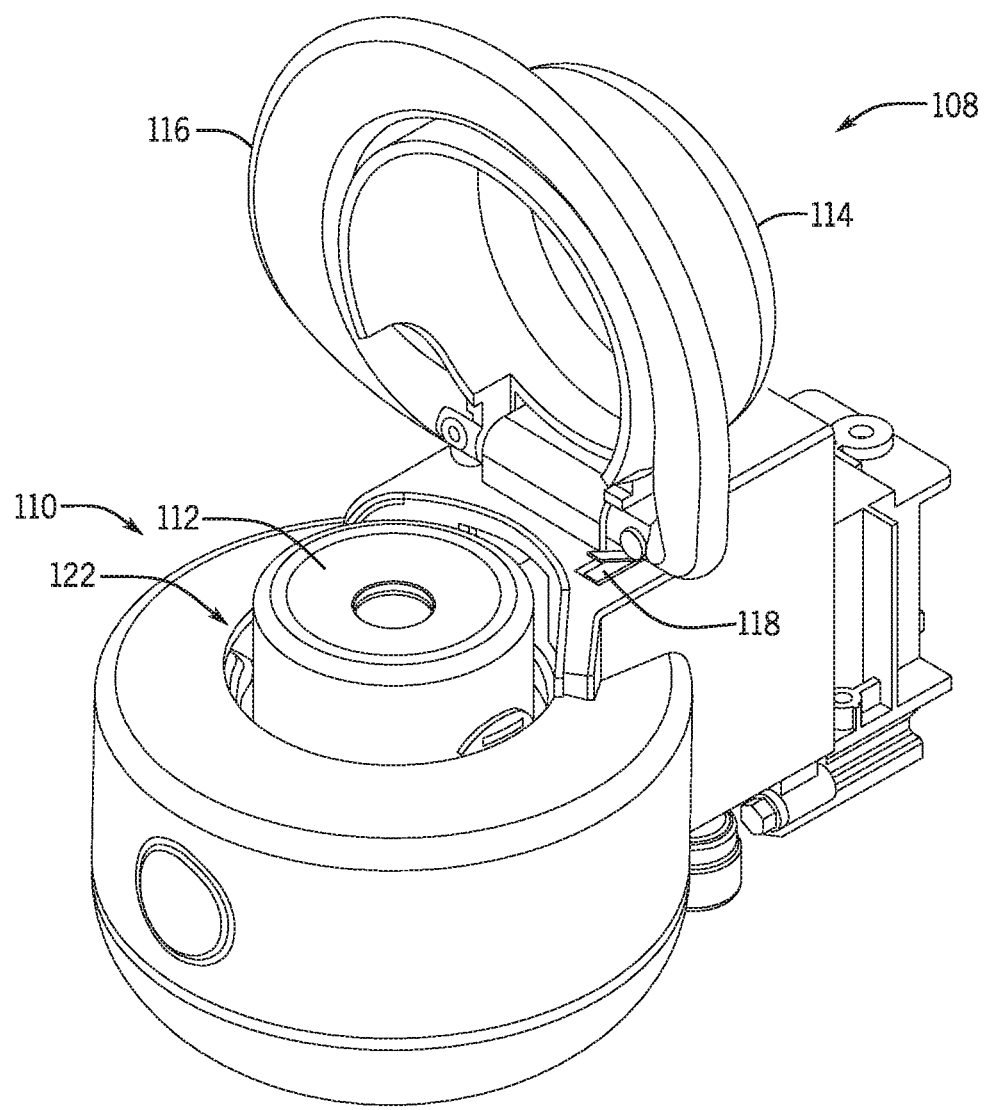
FIG. 2 is an isometric view of a dispensing assembly or station of the beverage machine of FIG. 1 with a beverage pod in accordance with various embodiments of the present disclosure.
Figure 3:
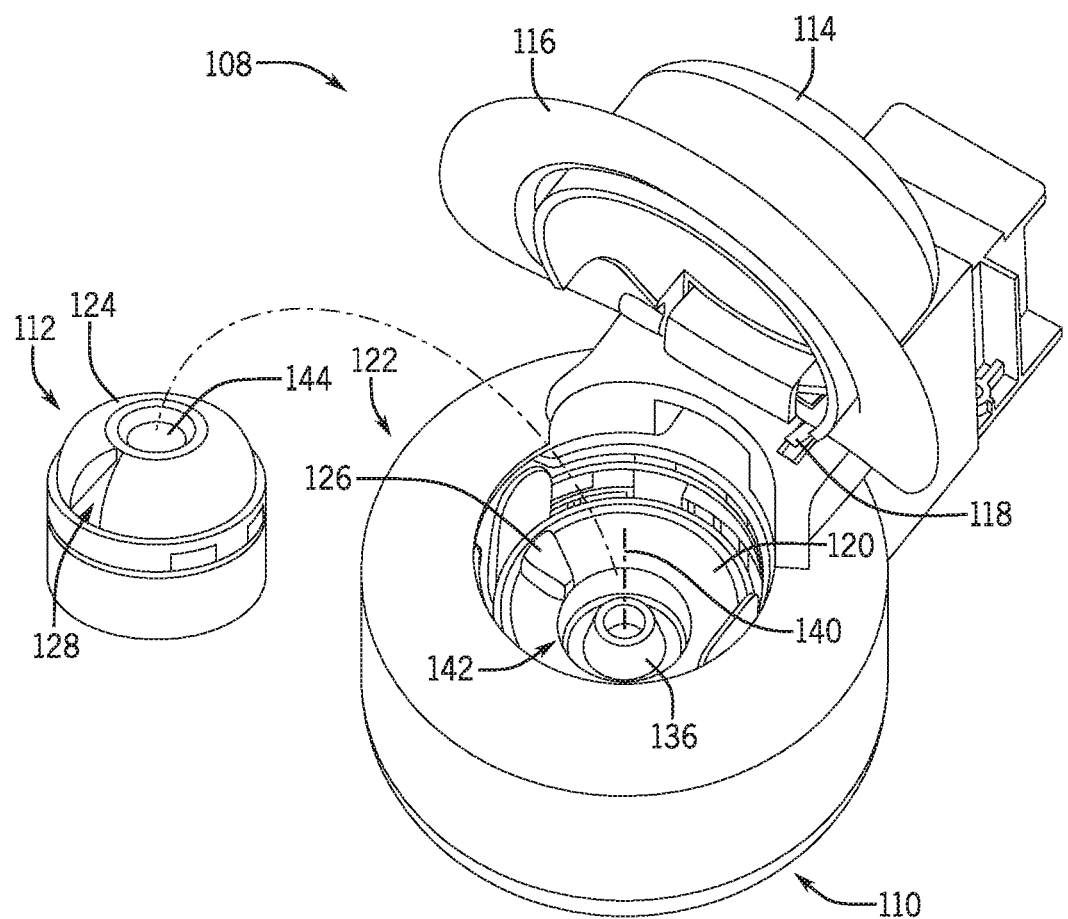
FIG. 3 is an isometric view of the dispensing assembly of FIG. 2 with the beverage pod removed in accordance with various embodiments of the present disclosure.

FIGS. 2 and 3 are isometric views of a puncture mechanism 110 of the beverage machine 100 in accordance with various embodiments of the present disclosure. The puncture mechanism 110 can be located in the dispensing station 108 of the beverage machine 100 (see FIG. 1), and the puncture mechanism 110 can be configured to puncture a beverage pod 112 received in the dispensing station 108. In various embodiments, the puncture mechanism 110 can be configured to grasp the pod 112 and puncture a seal of the pod 112.

As illustrated in FIG. 2, the dispensing station 108 can include a top cover 114 that can be moved into an open position to allow insertion of a pod 112 into a receiving cavity of the dispensing station 108. To move the top cover 114 into the open position illustrated in FIG. 2, a user can grasp a handle 116 coupled to the top cover 114 and pivot the top cover 114 into the open position. The dispensing station 108 can include a switch 118 that disengages when the top cover 114 is opened to restrict operation of the puncture mechanism 110 until the top cover 114 is closed.

As illustrated in FIGS. 2 and 3, the dispensing station 108 can be configured to receive the pod 112 in an upside-down orientation such that a top of the pod 112 is directed downward and a bottom of the pod 112 is directed upward. As illustrated in FIG. 3, the puncture mechanism 110 can include a pod seat 120 located at a bottom of the receiving cavity 122 of the dispensing station 108. The pod 112 can be seated onto the pod seat 120 such that a cap 124 of the pod 112 rests against the pod seat 120 when the pod 112 is received in the receiving cavity 122.

In various embodiments, the pod 112 and/or the pod seat 120 can include an alignment feature to ensure the pod 112 is positioned in the dispensing station 108 in a specific rotational orientation to facilitate engagement of one or more engagement members of the puncture mechanism 110 with the pod 112. Additionally, the rotational alignment can facilitate automatic identification of the pod 112, and thus its contents. In some embodiments, each pod 112 can include a barcode, and the alignment feature on the pod 112 and/or pod seat 120 can ensure the barcode is aligned with a barcode reader (e.g., a camera) of the dispensing station 108.

As illustrated in FIG. 3, the cap 124 of the pod 112 and the pod seat 120 can include corresponding alignment features that rotationally position the pod 112 within the receiving cavity 122. The alignment features can include a corresponding rib 126 and groove 128 (see FIG. 3), multiple ribs 130 and grooves 132 (see FIG. 5), or other structures that guide the pod 112 into a desired alignment within the receiving cavity 122 of the dispensing station 108.

Figure 14A:
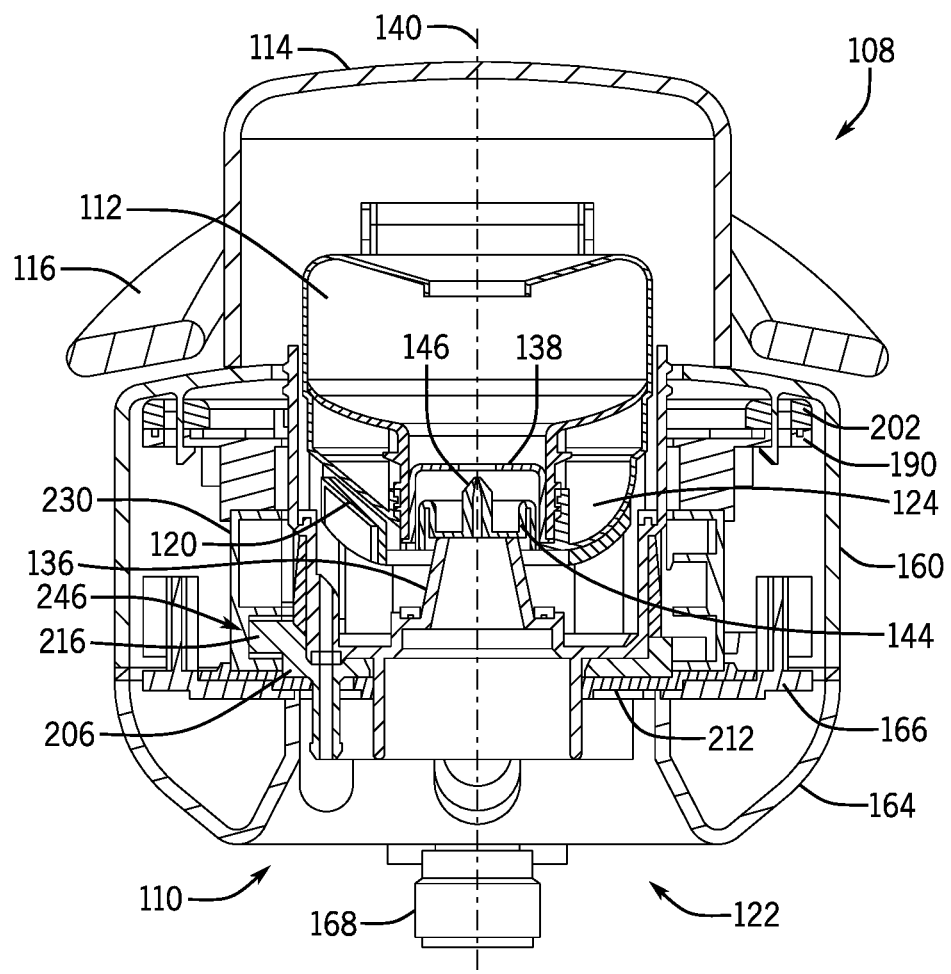
FIGS. 14A and 14B are cross-sectional views of the dispensing station of FIG. 1 in a nominal position and a puncture position, respectively, taken along line 14A-14A and in accordance with various embodiments of the present disclosure.
Figure 14B:
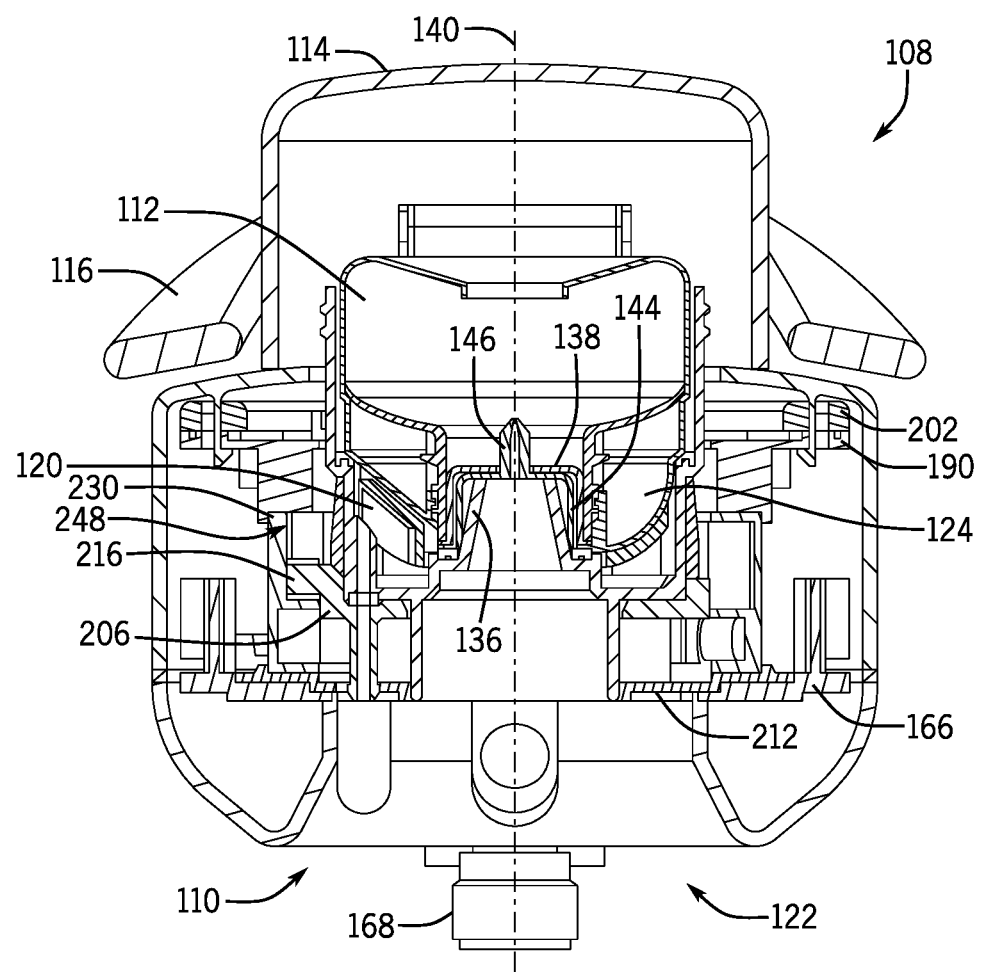

The puncture mechanism 110 can include an anvil 136 configured to puncture a seal 138 of the pod 112 (e.g., as shown in FIGS. 14A and 14B). In various embodiments, the seal 138 can be formed by a plug that seals a mouth of the pod bottle or container. The anvil 136 can be arranged coaxial with a longitudinal axis or centerline 140 of the puncture mechanism 110 and can be positioned at a bottom of the receiving cavity 122 of the dispensing station. The anvil 136 can be aligned with a central bore 142 of the pod seat 120 and can be selectively extended through the central bore 142 to puncture a seal 138 of the pod 112 in response to a user requesting a beverage (e.g., in response to a user loading a pod 112 into the receiving cavity 122 and pressing a brew or start button).

When the pod 112 is seated on the pod seat 120, the anvil 136 can be movable relative to the pod seat 120 along the longitudinal axis 140 into engagement with the cap 124 of the pod 112. The anvil 136 can contact a depressible portion (e.g., a rolling diaphragm 144) of the cap 124 of the pod 112. The anvil 136 can move the rolling diaphragm 144 toward a seal 138 located between the rolling diaphragm 144 and a beverage medium contained within the pod 112. Depression of the rolling diaphragm 144 by the anvil 136 can cause a needle 146 attached to an underside of the rolling diaphragm 144 (see, e.g., FIG. 5) to pierce the seal 138 of the pod 112, thereby permitting release of the beverage medium from the pod 112.

The pod seat 120 can be restricted from rotating relative to the anvil 136. For example, as illustrated in FIG. 5, the pod seat 120 can include one or more axially-extending rods 150, which can be received in respective axially-extending sleeves 152 of the anvil 136 (see FIG. 4) to restrict rotation of the pod seat 120 relative to the anvil 136. The rods 150 can be telescopically received in the sleeves 152 such that the anvil 136 can move axially along the longitudinal axis 140 of the puncture mechanism 110 relative to the pod seat 120. As such, the pod 112 can be supported by the pod seat 120 while the anvil 136 is moved from a nominal position to a puncture position in which the anvil 136 contacts the pod 112 and causes the pod seal 138 to be punctured.

As illustrated in FIG. 4, the pod seat 120 and the anvil 136 can be removable from the dispensing station 108 to facilitate cleaning of the pod seat 120 and the anvil 136. To aid removal of the pod seat 120 and the anvil 136, one or more tabs 154 can be coupled to the anvil 136 and can project upwardly from a periphery of the receiving cavity 122 for grasping by a user. The user can lift upward on the one or more tabs to remove the pod seat 120 and the anvil 136 from the dispensing station 108. As illustrated in FIG. 4, the pod seat 120 can be supported by a base 156 of the anvil 136, and thus lifting of the one or more tabs of the anvil 136 can lift the pod seat 120 in addition to the anvil 136.

Figure 6:
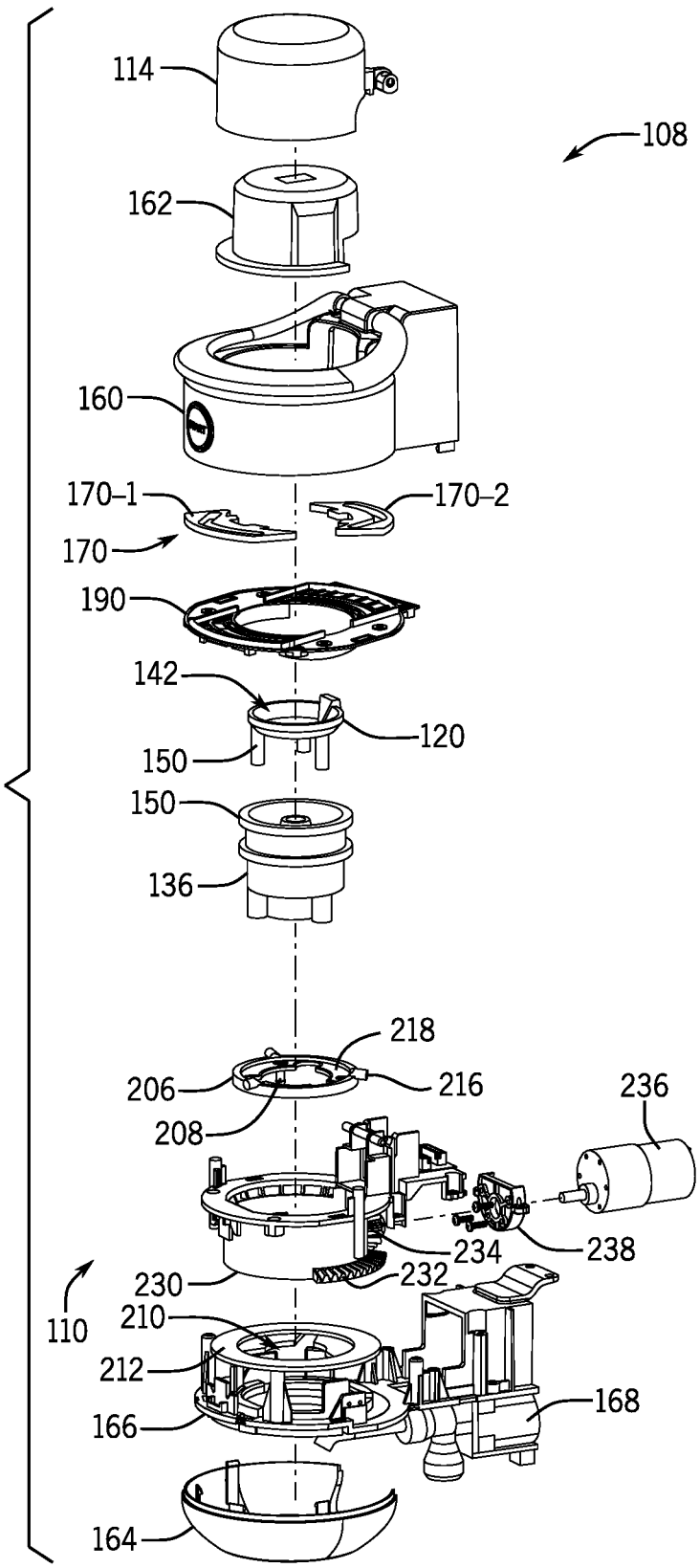
FIG. 6 is an exploded, isometric view of the dispensing station of FIG. 2 in accordance with various embodiments of the present disclosure.

FIG. 6 is an exploded, isometric view of the dispensing station 108 of FIG. 2 in accordance with various embodiments of the present disclosure. As illustrated in FIG. 6, the dispensing station 108 can include the puncture mechanism 110 and a housing for the puncture mechanism 110. The housing can include a main shell 160, the top cover 114 for closing a top opening of the main shell 160, an inner liner 162 for the top cover 114, and a bottom cover 164 for closing a bottom opening of the main shell 160. When assembled, the housing can substantially conceal the puncture mechanism 110 from view (see, e.g., FIG. 2).

Referring still to FIG. 6, the puncture mechanism 110 can include a base structure 166. The base structure 166 can be substantially fixed or stationary. For example, the base structure 166 can be fixedly attached to a frame of the beverage machine 100. The housing can be attached to and substantially conceal the base structure 166 from the user's view. As illustrated in FIG. 6, a liquid system 168 can be attached to the base structure 166, such as the underside of the base structure 166 as illustrated in FIG. 6. The liquid system 168 can be configured to deliver conditioned liquid to the dispensing station 108 for combination with the beverage medium contained in the pod 112.

Figure 7:
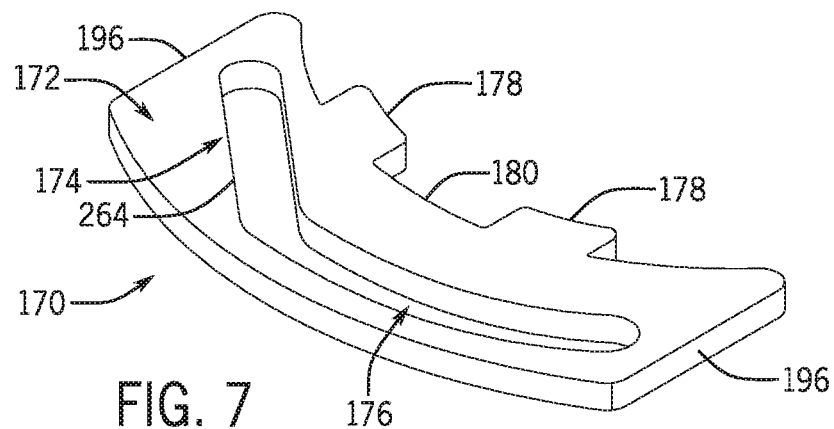
FIG. 7 is an isometric view of a sliding lock of the puncture mechanism illustrated in FIG. 6 in accordance with various embodiments of the present disclosure.

The puncture mechanism 110 can include a pod capture system. For example, the puncture mechanism 110 can include one or more sliding locks 170, which can function as cam followers (e.g., a second cam follower). In various embodiments, the puncture mechanism 110 includes a pair of sliding locks 170-1, 170-2 that are diametrically opposed from each other when the puncture mechanism 110 is assembled such that the sliding locks 170 engage opposite sides of the pod 112 to capture (e.g., securely hold) the pod 112. As illustrated in FIG. 7, each sliding lock 170 can include a cam feature. The cam feature can include a cam path 172 defined in a body of the lock 170. The cam path 172 can include a ramp section 174 and a dwell section 176. The ramp section 174 can be configured to cause lateral movement of the sliding lock 170 relative to the longitudinal axis 140 of the puncture mechanism 110, which can coincide with a longitudinal axis 140 of the pod 112 received in the receiving cavity 122 of the dispensing station 108. The dwell section 176 can be configured to cause no lateral movement of the sliding lock 170. The dwell section 176 can extend along a substantially constant radius of curvature having a radius originating at the longitudinal axis 140 of the puncture mechanism 110. In various embodiments, the ramp section 174 can extend at an oblique angle relative to the dwell section 176. As illustrated in FIG. 7, the ramp section 174 can extend inwardly at an oblique angle from an end of the dwell section 176.

Referring still to FIG. 7, each sliding lock 170 can include a pod engagement feature. In various embodiments, each sliding lock 170 can include one or more fingers, tabs, or teeth 178 extending inwardly from an inner surface 180 of the sliding lock 170. The inner surface 180 can have a radius of curvature substantially corresponding to a radius of curvature of an outer surface of the pod 112 (e.g., the cap 124 of the pod 112) such that when the sliding lock 170 is in an engaged position, the inner surface 180 of the sliding lock 170 confronts the outer surface of the pod 112 (e.g., an outer surface of the cap 124 as illustrated in FIG. 5). The one or more tabs 178 can be configured to extend through corresponding gaps 182 formed in the cap 124 and engage adjacent castellations 184 of the cap 124 (see, e.g., FIG. 5).

As illustrated in FIG. 5, the castellations 184 can be formed along a lower edge of a cylindrical boss extending downwardly from a top of the cap 124, and the boss can be coaxial with and surround the rolling diaphragm 144 and the needle 146. In various embodiments, as illustrated in FIG. 7, each sliding lock 170 can include two tabs 178 projecting inwardly from the inner surface 180, and, as illustrated in FIG. 5, the cap 124 of the pod 112 can include two pairs of gaps 182 diametrically opposed from each other to receive the tabs 178 of the sliding locks 170, thereby capturing the pod 112 between the opposed sliding locks 170.

Figure 8:
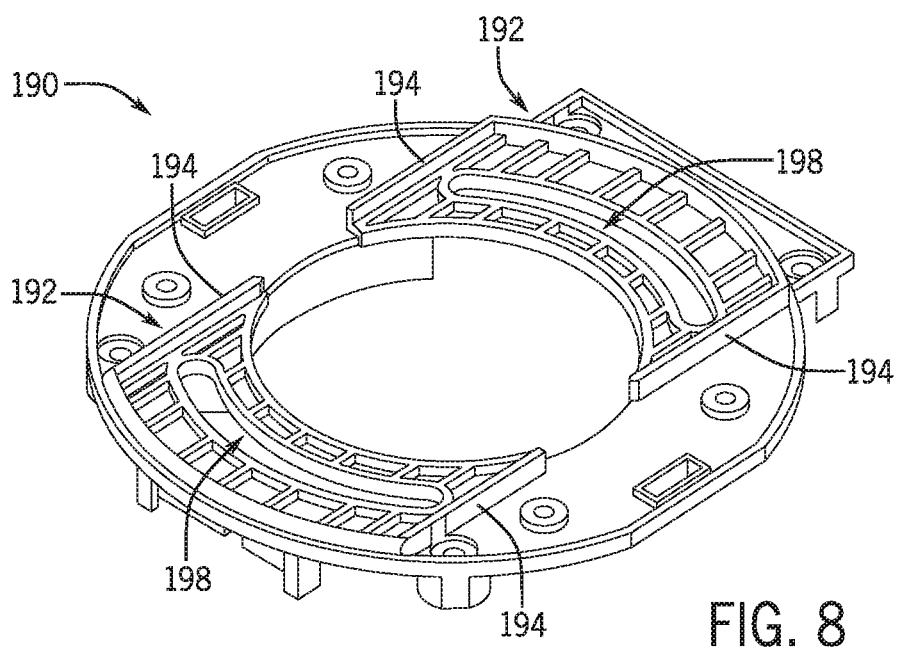
FIG. 8 is an isometric view of a base for the sliding lock of FIG. 7 in accordance with various embodiments of the present disclosure.

The puncture mechanism 110 can include a guide structure for the one or more sliding locks 170. For example, as illustrated in FIGS. 6 and 8, the guide structure can include a base 190 configured to support the one or more sliding locks 170. The base 190 can include a guide 192 for each sliding lock 170. Each guide 192 can be configured to limit the sliding locks 170 to a lateral movement toward or away from the longitudinal axis 140 of the puncture mechanism 110. For example, as illustrated in FIG. 8, each guide 192 can include opposing sidewalls 194 that abut against opposing ends 196 of the respective sliding lock 170 to guide the sliding lock 170 toward or away from the longitudinal axis 140 of the puncture mechanism 110. A slot 198 can be defined in each guide 192 for receipt of a cam, and the slot 198 can extend along a radius of curvature having a substantially constant radius originating at the longitudinal axis 140 of the puncture mechanism 110. As illustrated in FIG. 8, the base 190 can include two guides 192 diametrically opposed to each other and configured to support the sliding locks 170 such that the opposing sliding locks 170 are guided either toward each other or away from each other depending on the force exerted on the sliding locks 170 by the cams extending through the slots 198.

Figure 9:
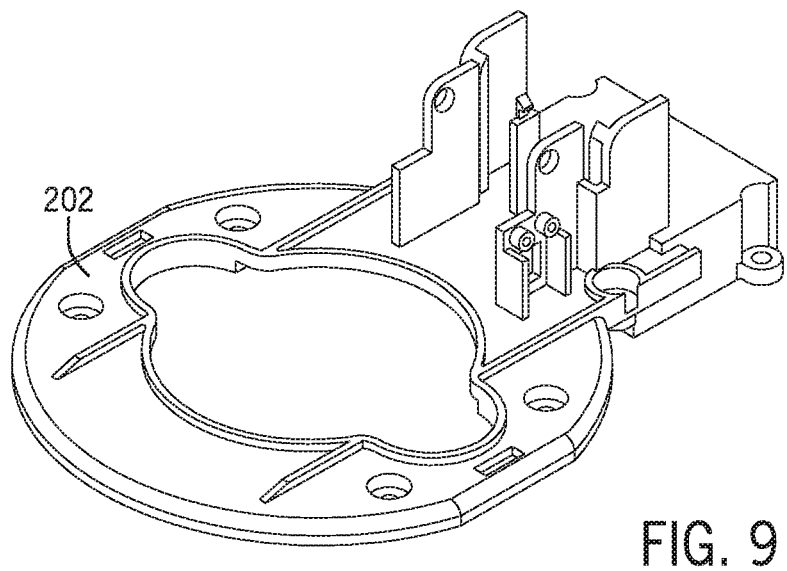
FIG. 9 is an isometric view of a cover for the sliding lock of FIG. 7 in accordance with various embodiments of the present disclosure.

As illustrated in FIGS. 6 and 9, the guide structure can include a cover 202 configured to overlie the base 190 such that the one or more sliding locks 170 are captured between the cover 202 and the base 190. The base 190 and the cover 202 can be fixed or stationary. For example, the base 190 and the cover 202 can be attached to the base structure 166 such that the base 190 and the cover 202 remain stationary during operation of the sliding locks 170. The sliding locks 170 can be received between the base 190 and the cover 202 and can slide relative to the base 190 and the cover 202 in response to movement of respective cams extending through the slots 198 of the base 190 and received in the cam paths 172 of the sliding locks 170.

Figure 10:
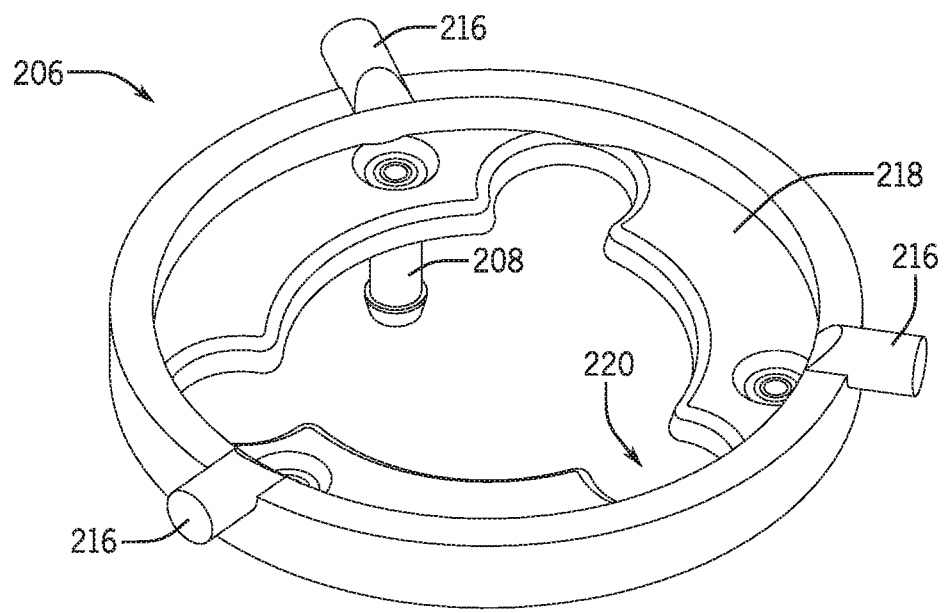
FIG. 10 is an isometric view of a carrier ring of the puncture mechanism illustrated in FIG. 6 in accordance with various embodiments of the present disclosure.

The anvil 136 can be supported by a movable member of the puncture mechanism 110. For example, as illustrated in FIGS. 6 and 10, the puncture mechanism 110 can include a carrier ring 206, which can function as a cam follower (e.g., a first cam follower). The carrier ring 206 can be restricted from rotating about the longitudinal axis 140 of the puncture mechanism 110. For example, the carrier ring 206 can include one or more axially-extending posts 208 that restrict rotation of the carrier ring 206 about the longitudinal axis 140 of the puncture mechanism 110. The posts 208 can extend through passages formed in a fixed or stationary structure of the puncture mechanism 110 such that the carrier ring 206 can move axially along the longitudinal axis 140 of the puncture mechanism 110, but is restricted from rotation thereabout. In some embodiments, the posts 208 extend through passages 210 formed in a bearing 212 of the puncture mechanism 110 (see FIG. 6).

The carrier ring 206 can include a cam feature for inducing the carrier ring 206 to move axially along the longitudinal axis 140 of the puncture mechanism 110. For example, as illustrated in FIG. 10, the carrier ring 206 can include one or more radially-extending pins 216. In various embodiments, the carrier ring 206 includes three pins 216 arranged equidistant from one another around the perimeter of the carrier ring 206 to ensure the carrier ring 206 is stably supported in a generally horizontal plane as it translates along the longitudinal axis 140 of the puncture mechanism 110. The pins 216 can project outwardly from the carrier ring 206 and can be configured to be received in respective cam paths, which can cause the carrier ring 206 to move in an axial direction as further explained below. Roller bearings can be mounted on the pins 216 to facilitate movement of the pins 216 within the respective cam paths.

The anvil 136 can be supported by the carrier ring 206 such that movement of the carrier ring 206 causes the anvil 136 to move axially along the longitudinal axis 140 of the puncture mechanism 110. For example, as illustrated in FIG. 10, the carrier ring 206 can define a support structure (e.g., a shelf) 218 configured to support the anvil 136. A portion of the anvil 136 can be positioned on top of the support 218, and thus the anvil 136 can move in unison with the carrier ring 206 along a length of the longitudinal axis 140. The carrier ring 206 can define one or more passages 220 through the carrier ring 206 (see FIG. 10) for receiving the one or more axially-extending sleeves 152 of the anvil 136 (see FIG. 4). The sleeves 152 can be snugly received within the passages to restrict rotation of the anvil 136 relative to the carrier ring 206.

Figure 11:
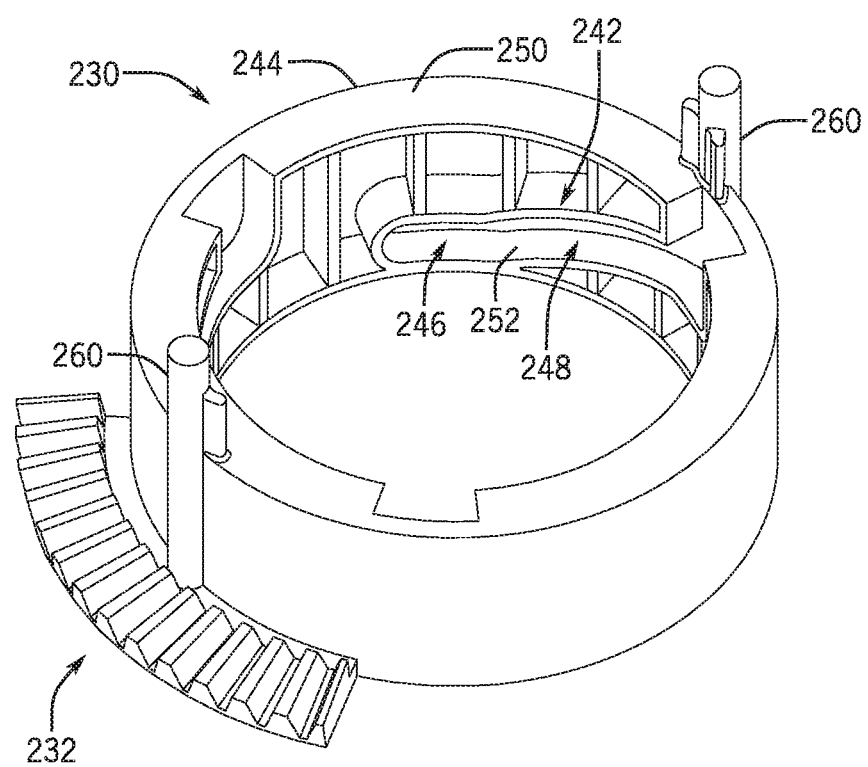
FIG. 11 is an isometric view of a cam driver of the puncture mechanism illustrated in FIG. 6 in accordance with various embodiments of the present disclosure.

The puncture mechanism 110 can include one or more cams for inducing movement in the one or more cam followers (e.g., the sliding locks 170 and/or the carrier ring 206). As illustrated in FIGS. 6 and 11, the puncture mechanism 110 can include a cam driver 230 for moving the one or more cams (e.g., a first cam and a second cam), which in turn can induce movement of the one or more cam followers (e.g., a first cam follower and a second cam follower. The cam driver 230 can rotatably bear against the bearing 210 (see FIG. 6), which can be non-rotatably supported by the base structure 166 of the puncture mechanism 110.

The cam driver 230 can be rotatable about the longitudinal axis 140 of the puncture mechanism 110. For example, as illustrated in FIGS. 6 and 11, the cam driver 230 can include a gear (e.g., a bevel gear) 232, which can intermesh with a pinion gear 234 driven by a motor 236. During operation, the motor 236 can turn the pinion gear 234, which in turn can rotate the cam driver 230 about the longitudinal axis 140 of the puncture mechanism 110 via the gear 232. The gear 232 can be arranged at a periphery of the cam driver 230 for engagement with the pinion gear 234, and the gear 232 can extend in a curved path defined by a substantially constant radius originating at the longitudinal axis 140 of the puncture mechanism 110. As illustrated in FIG. 6, the motor 236 can be attached to the base structure 166 of the puncture mechanism 110 by a motor mount 238.

The cam driver 230 can include a cam feature (e.g., a first cam) that induces axial movement of the carrier ring 206. For example, as illustrated in FIG. 11, the cam driver 230 can define a cam path 242, which can function as a cam, for each of the pins 216 of the carrier ring 206. Each pin 216 can extend into a respective cam path 242, and rotation of the cam driver 230 can cause the carrier ring 206 to move in an axial direction along the longitudinal axis 140 of the puncture mechanism 110 via the pins 216. In various embodiments, each cam path 242 can be defined in a substantially cylindrical sidewall 244 of the cam driver 230 extending lengthwise along, and centered about, the longitudinal axis 140 of the puncture mechanism 110. As illustrated in FIG. 11, each cam path 242 can include a dwell section 246 configured to cause no axial movement of the carrier ring 206 and a ramp section 248 configured to cause axial movement of the carrier ring 206. The dwell section 246 of a respective cam path 242 can extend in a curved path along a substantially circular arc defined at a constant axial position of the cam driver 230. The ramp section 248 can extend at an oblique angle from an end of the dwell section 246 toward an end 250 of the sidewall 244, and thus can include an axial component that induces axial motion of the carrier ring 206. In various embodiments, the ramp section 248 can extend in a curved path along a substantially helical arc.

As previously discussed, the carrier ring 206 can be restricted from rotating about the longitudinal axis 140 of the puncture mechanism 110. Thus, as the cam driver 230 is rotated about the longitudinal axis 140, the cam path 242 can drive the carrier ring 206 axially along the longitudinal axis 140 of the puncture mechanism 110. During rotation of the cam driver 230, the one or more pins 216 of the carrier ring 206 originally can be located in the dwell section 246 of their respective cam path 242, and thus the cam driver 230 induces no axial movement to the carrier ring 206 as the dwell section 246 extends in a substantially circular arc around the sidewall 244 of the cam driver 230. When the dwell section 246 of the cam path 242 transitions into the ramp section 248, one or more of the cam surfaces 252 defining the cam path 242 can contact the pins 216 of the carrier ring 206 and force the pins 216 to move in an axial direction to remain in the cam path 242, thereby inducing axial motion of the carrier ring 206. As previously discussed, the anvil 136 can be supported by the carrier ring 206, and thus rotation of the cam driver 230 can cause axial movement of the anvil 136, via the carrier ring 206, along the longitudinal axis 140 of the puncture mechanism 110. Depending on the direction of rotation of the cam driver 230, the cam path 242 can either drive the carrier ring 206 and the anvil 136 towards or away from the pod 112.

The cam driver 230 can include a cam feature (e.g., a second cam) that induces lateral movement of the one or more sliding locks 170. For example, as illustrated in FIG. 11, the cam driver 230 can define one or more shafts 260, which can function as a cam, for driving the one or more sliding locks 170 in a transverse direction relative to the longitudinal axis 140 of the puncture mechanism 110. The one or more shafts 260 can extend in an axial direction generally parallel to the longitudinal axis 140 of the puncture mechanism 110. The one or more shafts 260 can have a cylindrical shape. In various embodiments, the cam driver 230 includes a pair of shafts 260 that are arranged diametrically opposite each other along the sidewall 244 of the cam driver 230. The shafts 260 can project upwardly from the end 250 of the sidewall 244 and can be configured to extend through the slots 198 in the base 190 and into the cam paths 172 of the sliding locks 170.

As previously discussed, the sliding locks 170 can be restricted from rotating about the longitudinal axis 140 of the puncture mechanism 110 via the guide structure (e.g., the base 190 and the cover 202). Thus, as the cam driver 230 is rotated about the longitudinal axis 140, the shafts 260 can drive the sliding locks 170 in a lateral direction transverse (e.g., perpendicular) to the longitudinal axis 140 of the puncture mechanism 110 either toward or away from the longitudinal axis 140. During rotation of the cam driver 230, the shafts 260 originally can be located in the ramp section 174 of the respective cam paths 172 of the sliding locks 170 and thus as the shafts 260 rotate in a circular path about the longitudinal axis 140 of the puncture mechanism 110, the shafts 260 can contact the cam surfaces 264 defining the ramp section 174 of the cam path 172 of each sliding lock 170 and force the sliding locks 170 to move in a lateral direction either toward or away from the longitudinal axis 140 of the puncture mechanism 110 (and thus toward or away from the pod 112 received in the receiving cavity 122 of the puncture mechanism 110) depending on the rotational direction of the cam driver 230. When the shafts 260 exit the ramp section 174 and enter the dwell section 176 of the cam path 172 of each sliding lock 170, the cam driver 230 can rotate without inducing lateral movement of the sliding locks 170 as the dwell sections 176 generally align with the rotational path of the shafts 260 and thus the shafts 260 do not induce lateral movement of the sliding locks 170 when located in the dwell sections 176 of the sliding locks 170.

Figure 12A:
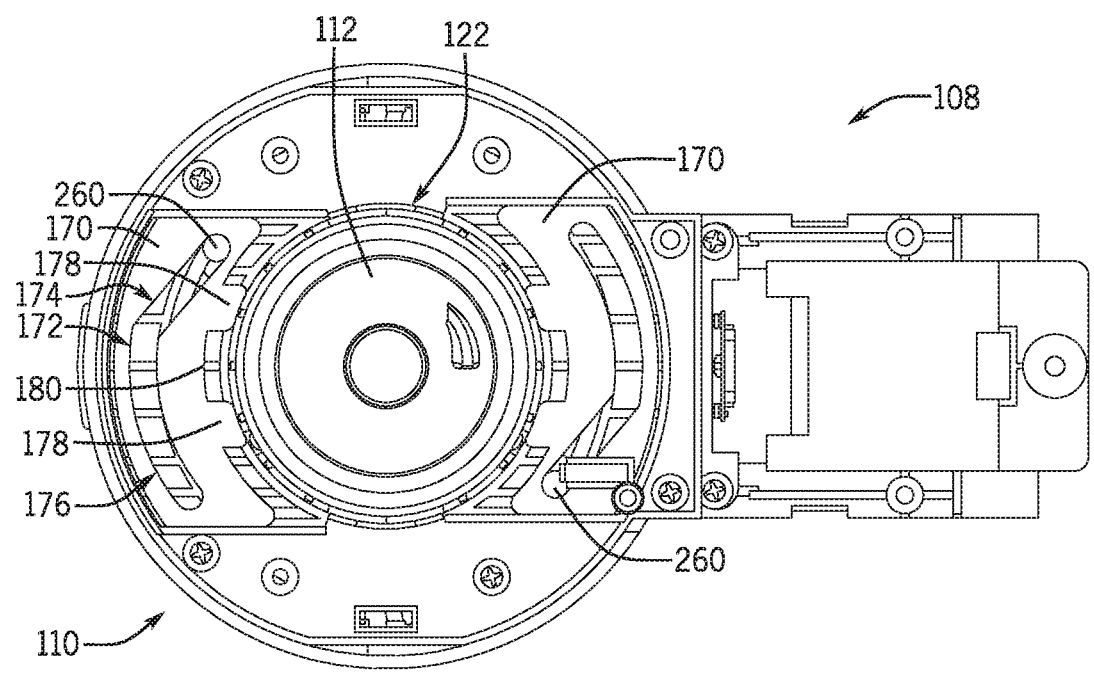
FIGS. 12A-12C are fragmentary, top plan views of the puncture mechanism illustrated in FIG. 6 illustrating sliding locks in different positions of engagement with a beverage pod in accordance with various embodiments of the present disclosure.
Figure 12B:
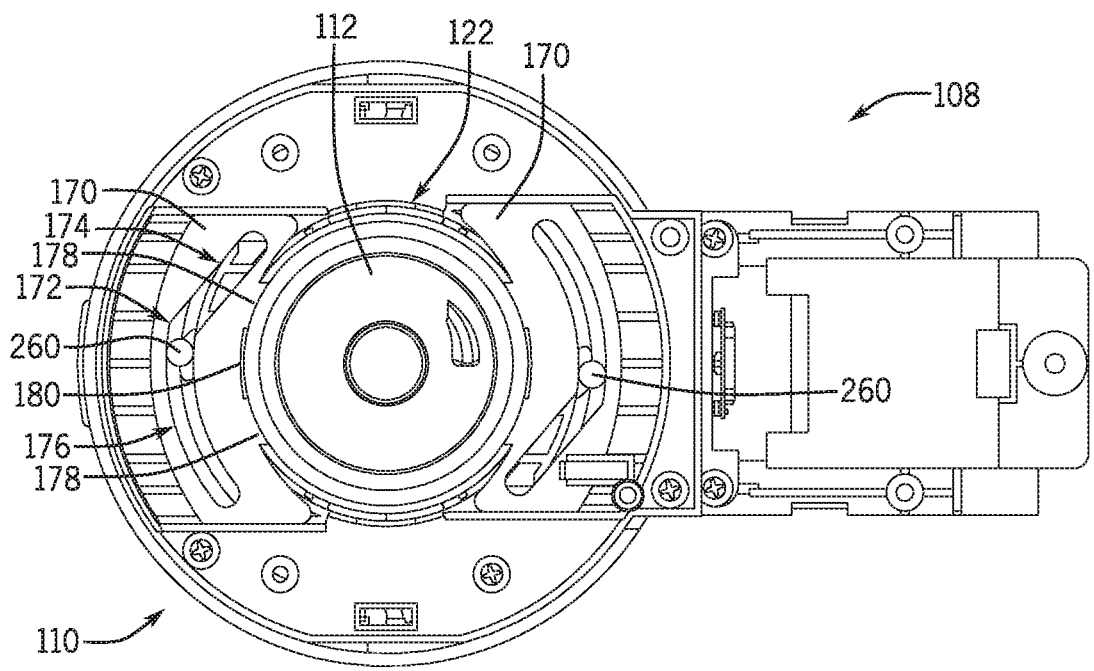
Figure 12C:
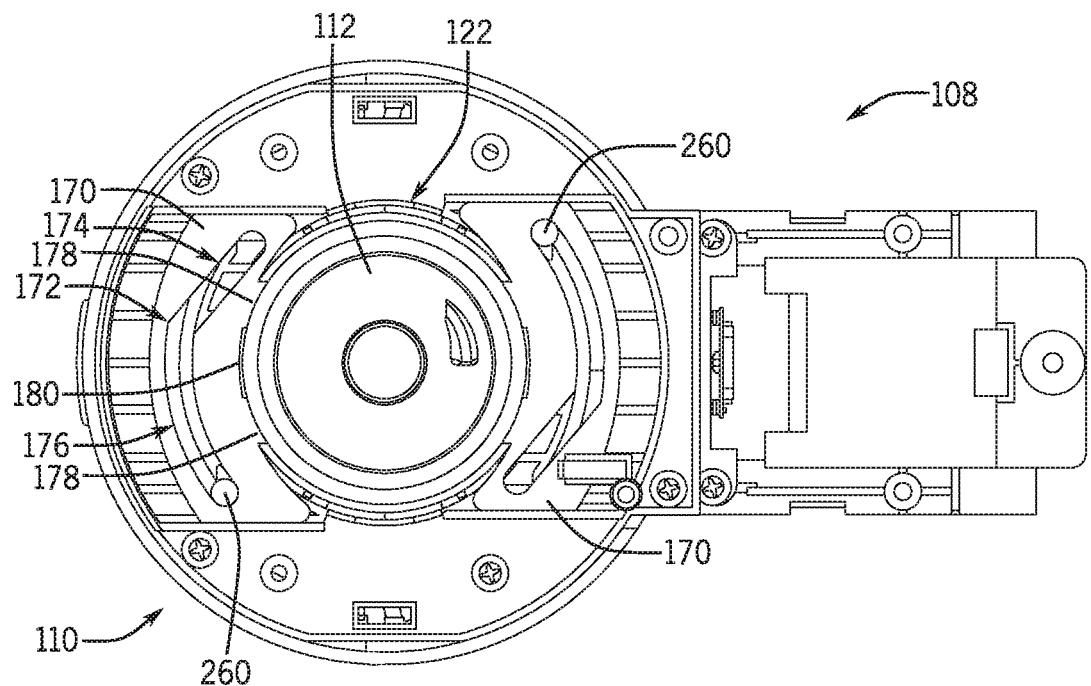

FIGS. 12A-12C are fragmentary, top plan views of the puncture mechanism 110 illustrating the sliding locks 170 in different positions of engagement with a beverage pod 112 in accordance with various embodiments of the present disclosure. In FIG. 12A, the sliding locks 170 are disengaged from the beverage pod 112. The sliding locks 170 generally are in this position when a user opens the top cover 114 on the dispensing station 108 and inserts a pod 112 into the receiving cavity 122. When the user closes the top cover 114 and pushes the brew or start button, the beverage machine 100 generally conditions a liquid for combination with a beverage medium contained in the pod 112.

When the conditioned liquid is ready for combination with the beverage medium, the motor 236 can be activated to rotate the cam driver 230. Rotation of the cam driver 230 can cause the shafts 260 to rotate along a substantially circular path, and the shafts 260, in turn, cause the sliding locks 170 to move laterally inward toward the pod 112 as the shafts 260 progress along the ramp sections 174 of the cam paths 170 defined in the sliding locks 170. When the shafts 260 reach the end of the ramp sections 174 and enter the dwell sections 176 of the cam paths 170 in the sliding locks 170 (see FIG. 12B), the sliding locks 170 generally are fully engaged with the pod 112 such that the pod 112 is restricted from moving axially along the longitudinal axis 140 of the puncture mechanism 110 relative to the sliding locks 170. The tabs 178 of the sliding locks 170 can be received in the gaps 182 defined in the cap 124 of the pod 112 (see FIG. 5) to restrict axial movement of the pod 112 within the receiving cavity 122 of the dispensing station 108.

Continued rotation of the cam driver 230 can cause the shafts 260 to rotate within the dwell sections 176 of the cam paths 172 of the sliding locks 170, which generally results in no motion of the sliding locks 170 relative to the pod 112 because the dwell sections 176 have substantially the same radius of curvature as the rotational path of the shafts 260. To disengage the sliding locks 170 from the pod 112, the cam driver 230 can be rotated in an opposite direction until the shafts 260 of the cam driver 230 reach the end of the ramp section 174 of the cam paths 172 of the sliding locks 170.

Figure 13:
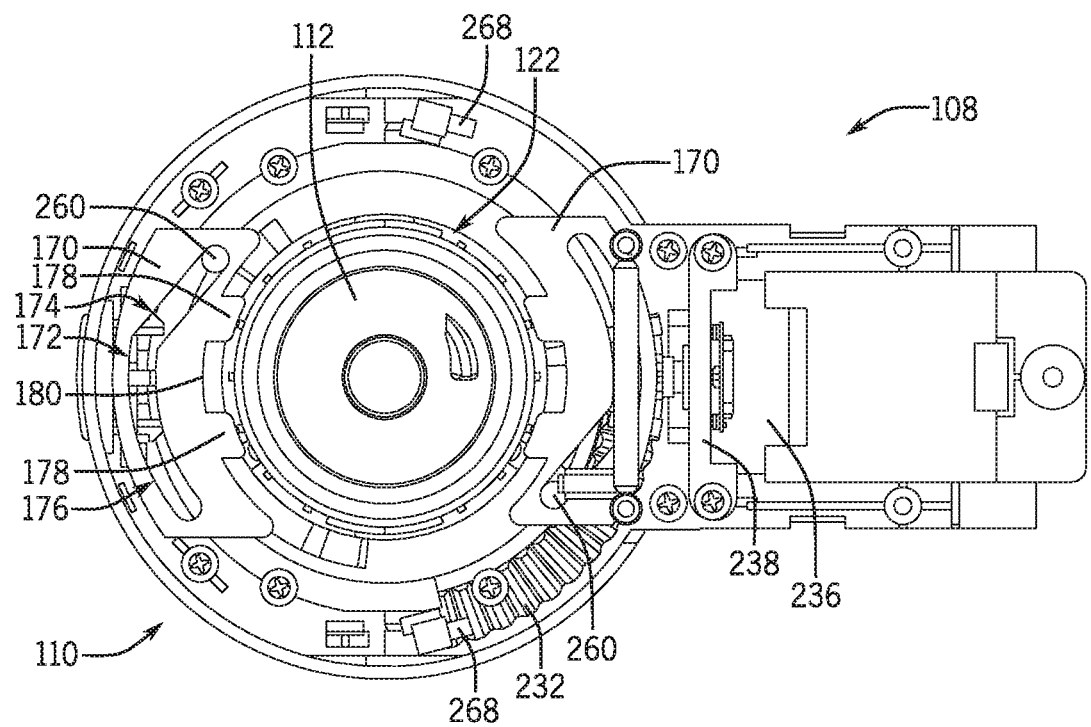
FIG. 13 is a fragmentary, top plan view of the puncture mechanism illustrated in FIG. 6, illustrating a switch in accordance with various embodiments of the present disclosure.

The puncture mechanism 110 can be operable to shut off the motor 236 when the shafts 260 reach the end of their respective cam paths 170. For example, as illustrated in FIG. 13, the puncture mechanism 110 can include a switch 268 associated with each end of the respective cam path 170. The switches 268 can be attached to a stationary component of the puncture mechanism 110, such as the base structure 166. The switches 268 can be positioned within the rotational path of the cam driver 230 such that the cam driver 230 activates one of the switches 268 at each end of the cam path 170. For example, the switches 268 can be positioned within the rotational path of the gear 232 of the cam driver 230. When the motor 236 has driven the cam driver 230 into a rotational position in which the shafts 260 are positioned at first ends of the cam paths 172, a first end of the gear 232 can contact the switch 268 associated with the first ends of the cam paths 172 to deactivate the motor 236. Similarly, when the motor 236 has driven the cam driver 230 into a rotational position in which the shafts 260 are positioned at second ends of the cam paths 172, a second end of the gear 232 can contact the switch 268 associated with the second ends of the cam paths 172 to deactivate the motor 236. Thus, the switches 268 can provide a safety feature to ensure the motor 236 does not over rotate the cam driver 230 during operation of the puncture mechanism 110.

FIGS. 14A and 14B are cross-sectional views the dispensing station 108, including the puncture mechanism 110. FIGS. 14A and 14B show the anvil 136 in a nominal position and a puncture position, respectively, in accordance with various embodiments of the present disclosure. As illustrated in FIG. 14A, the anvil 136 initially can be in a nominal position in which the anvil 136 does not cause the seal 138 of the pod 112 to be punctured. In the nominal position, the pod 112 can be supported by the pod seat 120 and the anvil 136 can be separated from or abut the rolling diaphragm 144 on the cap 124 of the pod 112. The anvil 136 can be supported by the carrier ring 206, and the pins 216 of the carrier ring 206 can be positioned in the dwell sections 246 of the cam paths 242 defined by the cam driver 230. As the cam driver 230 is rotated about the longitudinal axis 140 of the puncture mechanism 110, the cam driver 230 can force the sliding locks 170 into engagement with the pod 112 to restrict axial movement of the pod 112 within the receiving cavity 122 of the dispensing station 108, as previously discussed. During movement of the sliding locks 170 towards the pod 112, the anvil 136 can remain substantially stationary so as to not move the pod 112 along the longitudinal axis 140 relative to the sliding locks 170.

When the pod 112 is fully engaged by the sliding locks 170, the cam shafts 260 can enter into the dwell section 176 of the cam paths 172 of the sliding locks 170 so as to maintain the sliding locks 170 in engagement with the pod 112 (see FIGS. 12A and 12B). Substantially, simultaneously with the transition of the shafts 260 into the dwell sections 176 of the cam paths 172 of the sliding locks 170, the radial pins 216 of the carrier ring 206 can enter into the ramp sections 248 of the cam paths 242 defined in the axially-extending wall 244 of the cam driver 230 (see FIG. 11). Continued rotation of the cam driver 230 can cause the ramp sections 248 to translate the carrier ring 206 along the longitudinal axis 140 of the puncture mechanism 110, thereby translating the anvil 136 upwards toward the pod 112, which is axially fixed via the sliding locks 170. As the anvil 136 is translated upwards via the carrier ring 206, the anvil 136 can contact the rolling diaphragm 144 and cause the rolling diaphragm 144 to move towards the pod seal 138, as generally illustrated in the progression from FIG. 14A to FIG. 14B. Continued upward movement of the anvil 136 can cause the needle 146 attached to the rolling diaphragm 144 to puncture the pod seal 138, thereby permitting evacuation of the beverage medium from the pod 112. In the puncture position of FIG. 14B, the anvil 136 is raised relative to its nominal position illustrated in FIG. 14A such that the pod needle 146 punctures the pod seal 138. After the seal 138 is punctured, the beverage medium can be evacuated from the pod 112, mixed with a conditioned liquid, and dispensed into a user's container. When dispensing is complete, the motor 236 can rotate in an opposite direction, lowering the anvil 136 axially away from the pod 112 and sliding the locks 170 laterally away from the pod 112. Then, the user can lift the handle and remove the empty pod 112 from the dispensing station 108.

In operation, a user can close the top cover 114 via the handle 116 to actuate the puncture mechanism 110. The close switch 118 can be engaged when the top cover 114 is closed, thereby indicating to the beverage machine 100 that the puncture mechanism 110 is closed. A camera or other device can read a barcode on the pod 112, and the beverage machine 100 can determine what recipe to proceed with based on the barcode. When the user presses the brew or start button on the machine 100, a precursor liquid can be conditioned for mixing with a beverage medium (e.g., a flavoring agent) contained in the pod 112. When the liquid has been conditioned and is ready for mixing, the motor 236 can be activated. The motor 236 can rotate the cam driver 230 of the puncture mechanism 110 to puncture the pod 112, thereby permitting mixing of the beverage medium with a conditioned liquid for dispensing into a user's container. During motor 236 operation, the motor 236 can rotate a gear 234 coupled to its drive shaft, and the gear 234 can be intermeshed with a gear 232 attached to the cam driver 230. As the gear 232 of the cam driver 230 is driven by the motor 236, the cam driver 230 can be rotated about the longitudinal axis 140 of the puncture mechanism 110. Rotation of the cam driver 230 can cause one or more sliding locks 170 to move laterally and engage the pod 112 to restrict axial movement of the pod 112, and then the cam driver 230 can cause the anvil 136 to be raised into engagement with the pod 112 to cause the pod needle 146 to puncture the pod seal 138.

Figure 15:
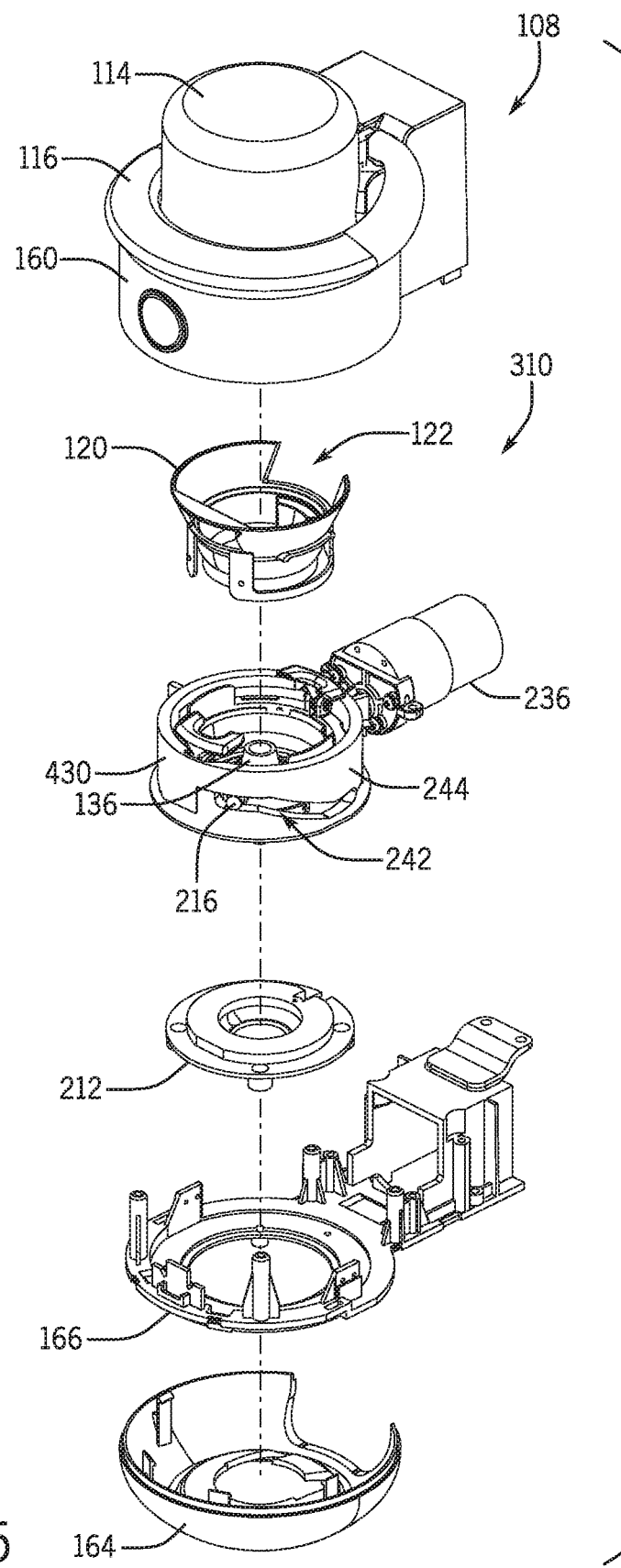
FIG. 15 is an exploded, isometric view of the dispensing station of FIG. 2 with a different puncture mechanism in accordance with various embodiments of the present disclosure.
Figure 16:
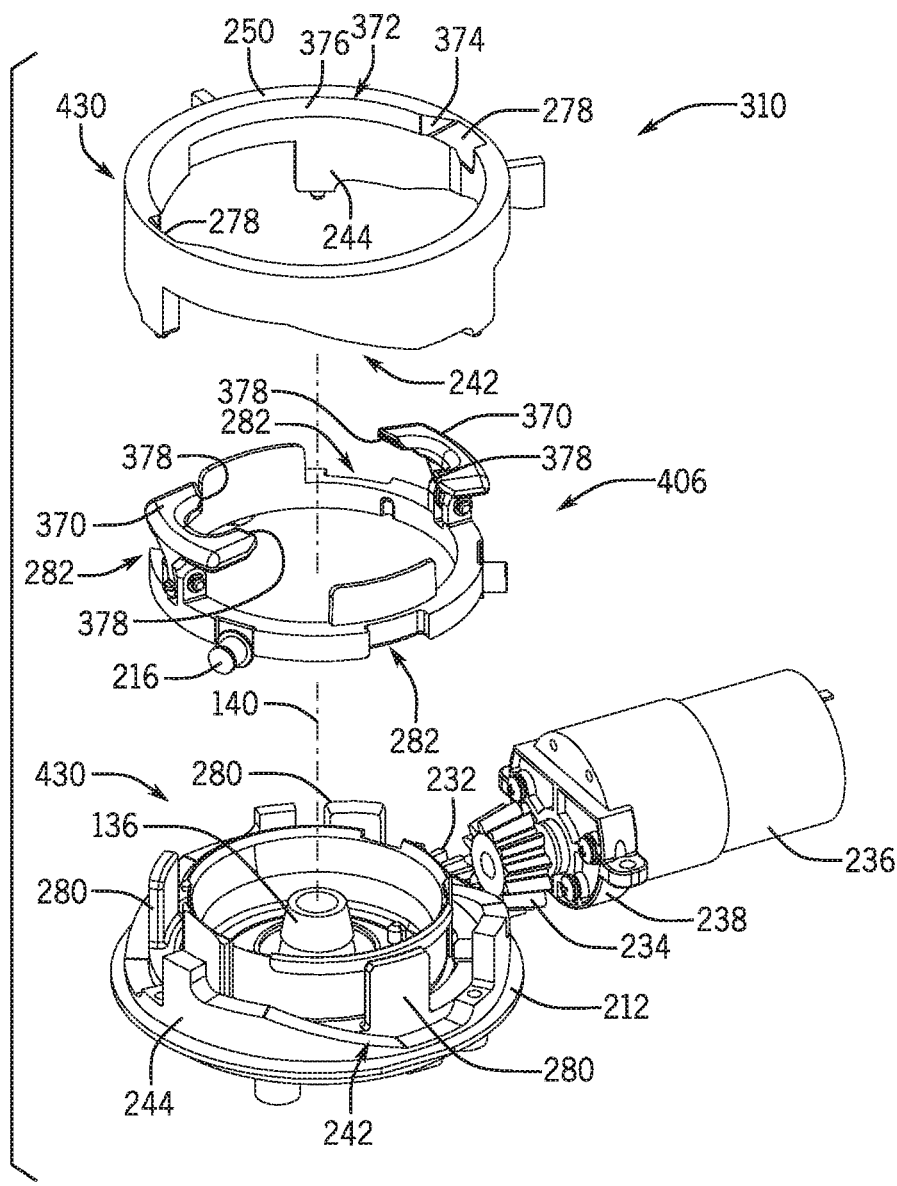
FIG. 16 is an exploded, isometric view of the puncture mechanism of FIG. 15 in accordance with various embodiments of the present disclosure.

FIGS. 15 and 16 are exploded, isometric views of a puncture mechanism 310 for the dispensing station 108 in accordance with various embodiments of the present disclosure. With the exception of the stationary pod 112 held by the slidable locks 170 and the movable anvil 136 carried by the carrier ring 206 generally illustrated in FIGS. 2-14B, the puncture mechanism 310 illustrated in FIGS. 15 and 16 generally has the same features and operation as the puncture mechanism 110 illustrated in FIGS. 1-14. Accordingly, the preceding discussion of the features and operation of the puncture mechanism 110 illustrated in FIGS. 1-14 should be considered equally applicable to the puncture mechanism 310 illustrated in FIGS. 15 and 16, except as noted in the following discussion pertaining to the configuration of the pivotable locks 370 and the movement of the pod 112 via the carrier ring 406 towards the stationary anvil 136. The reference numerals used in FIGS. 15 and 16 correspond to the reference numerals used in FIGS. 1-14 to reflect similar parts and attachments, except the first digit of each reference numeral associated with a modified part or attachment is incremented by two. The descriptions of unmodified structures and operations generally are omitted because they are the same as those described above with respect to the puncture mechanism illustrated in FIGS. 2-14.

Referring to FIGS. 15 and 16, the dispensing station 108 can include a puncture mechanism 310 and a housing. Similar to FIG. 6, the housing can include the main shell 160, the top cover 114, and the bottom cover 164. When assembled, the housing can be attached to the base structure 166 (see FIG. 15) and can substantially conceal the puncture mechanism 310 from view, similar to FIG. 2. Although not illustrated in FIGS. 15 and 16, the liquid system 168 (see, e.g., FIG. 6) can be attached to the base structure 166. The liquid system 168 can be configured to deliver conditioned liquid to the dispensing station 108 for combination with the beverage medium contained in the pod 112.

In contrast to the puncture mechanism 110 of FIGS. 2-14, the anvil 136 of the puncture mechanism 310 illustrated in FIGS. 15 and 16 can be substantially stationary. For example, the anvil 136 of the puncture mechanism 310 can have substantially no axial movement along the longitudinal axis 140 of the puncture mechanism 310 (see FIG. 16) during operation of the puncture mechanism 310. Instead, the anvil 136 can be substantially stationary, and the puncture mechanism 310 can move the beverage pod 112 into contact with the anvil 136 to puncture the pod 112.

As illustrated in FIG. 15, the anvil 136 can be supported by the bearing 212, which can also support the cam driver 430. The bearing 212 can be attached to the base structure 166 such that the bearing 212, and thus the anvil 136, do not move axially relative to the stationary base structure 166 during operation of the puncture mechanism 310. As illustrated in FIG. 16, the carrier ring 406 can be modified relative to the carrier ring 206 of the puncture mechanism 110 illustrated in FIGS. 2-14. For example, the support structure 218 of the carrier ring 206 (see FIG. 10) can be removed, as the anvil 136 is not carried by the carrier ring 406 in the puncture mechanism 310 illustrated in FIGS. 15 and 16. Instead of carrying the anvil 136, the carrier ring 406 illustrated in FIG. 16 can be configured to carry the pod 112 such that axial movement of the carrier ring 406 causes axial movement of the pod 112 relative to the stationary anvil 136.

For example, as illustrated in FIG. 16, the carrier ring 406 can include a pod capture system for securely holding the pod 112.

In various embodiments, as illustrated in FIG. 16, the carrier ring 406 can include movable locks (e.g., pivotable locks) 370 for securely holding the pod 112 such that the pod 112 moves in unison with the carrier ring 406 in an axial direction along the longitudinal axis 140 of the puncture mechanism 310. The pivotable locks 370 can capture (e.g., securely hold) the beverage pod 112 similar to the sliding locks 170 of the puncture mechanism 110, such as by extending one or more tabs 378 into gaps 182 in the cap 124 of the pod 112 and engaging castellations 184 of the pod 112 (see FIG. 5). However, the pivotable locks 370 can pivot into engagement with the pod 112, rather than slide into engagement like the sliding locks 170 of the puncture mechanism 110. Also, the pivotable locks 370 can be pivotally attached to the carrier ring 406 such that the captured pod 112 moves with the carrier ring 406 relative to the anvil 136, rather than moving the anvil 136 relative to the pod 112 via the carrier ring 206 as described with respect to the puncture mechanism 110 generally illustrated in FIGS. 2-14.

In contrast to the shafts 260 of the cam driver 230, which generally are configured to drive the slidable locks 170 of the puncture mechanism 110 of FIGS. 2-14, the cam driver 430 illustrated in FIG. 16 can include a cam surface 372 defined by the sidewall 244 of the cam driver 430. As illustrated in FIG. 16, the cam surface 372 can be located adjacent the end 250 of the sidewall 244 and can project radially inwardly toward the longitudinal axis 140. Recesses 278 can be formed in the sidewall 244 for seating the pivotable locks 370 when the locks 370 are disengaged from the beverage pod, and the cam surface 372 for each lock 370 can originate adjacent one of the recesses 278. The cam surface 372 can be configured to move the pivotal locks 370 in a lateral direction toward the longitudinal axis 140 of the puncture mechanism 310 as the cam driver 430 is rotated relative to the carrier ring 406 and the pivotable locks 370. The pivotal locks 370 can be biased, such as by a spring, away from the longitudinal axis 140 of the puncture mechanism 310 so as to remain in engagement with the cam surface 372 during rotation of the cam driver 430 relative to the locks 370. To drive the pivotal locks 370 into engagement with the pod 112, each cam surface 372 can include a ramp section 374 that starts at an end of one of the recesses 278 and extends radially inwards generally toward the longitudinal axis 140. Similar to the carrier ring 206 of the puncture mechanism 110 illustrated in FIGS. 2-14, the carrier ring 406 can be non-rotatable. For example, the carrier ring 406 can be keyed to the stationary base structure 166 via corresponding ribs 280 and grooves 282 that restrict rotation of the carrier ring 406 but allow axial movement of the carrier ring 406 relative to the base structure 166.

Rotation of the cam driver 430 relative to the non-rotatable carrier ring 406 generally causes the cam surface 372 to move along the pivotable locks 370. As the ramp section 248 moves along the pivotable locks 370, the ramp section 374 generally causes the pivotable locks 370 to pivot laterally toward the pod 112 and into engagement with the pod 112. When the pivotable locks 370 are engaged with the pod 112, the ramp section 374 of the cam surface 372 can transition into a dwell section 376 defined at a constant radius originating at the longitudinal axis 140 of the puncture mechanism 310. The dwell section 376 can maintain the pivotable locks 370 in engagement with the pod 112 while the carrier ring 406, and thus the pod 112, is translated toward the anvil 136. Similar to the carrier ring 206 described above with respect to the puncture mechanism 110, the carrier ring 406 can include radially-extending pins 216 that are received in cam paths 242 defined in the axially-extending sidewall 244 of the cam driver 430. Rotation of the cam driver 430 causes the pins 216 to move along the cam paths 242, resulting in axial translation of the carrier ring 406 along the longitudinal axis 140 of the puncture mechanism 310.

During operation, the motor 236 can rotate the cam driver 430 of the puncture mechanism 310. For example, the motor 236 can rotate the gear 234 coupled to its drive shaft, and the gear 234 can be intermeshed with a corresponding gear 232 attached to the cam driver 430 to rotate the cam driver 430 about the longitudinal axis 140 of the puncture mechanism 310. Rotation of the cam driver 430 can cause the one or more locks 370 pivotally attached to the carrier ring 406 to move laterally into engagement with the pod 112 to securely hold the pod 112 to the carrier ring 406. Continued rotation of the cam driver 430 can cause the carrier ring 406 and the captured pod 112 to be lowered such that the pod 112 engages the anvil 136, which causes the pod needle 146 to puncture the pod seal 138, thereby permitting mixing of the beverage medium with a conditioned liquid for dispensing into a user's container.

Referring generally to FIGS. 1-16, the beverage machine can include a puncture mechanism operable to puncture a sealed pod received in the dispensing station to release a beverage medium contained in the pod. In various embodiments, the puncture mechanism can securely hold the pod and cause relative movement between the anvil and the pod to cause the pod to be punctured by the anvil. In some embodiments, the puncture mechanism can inhibit the pod from moving in an axial direction along its longitudinal axis, and the puncture mechanism can move the anvil into contact with the pod to puncture the pod. In some embodiments, the puncture mechanism can securely hold the pod and can move the pod into contact with a stationary anvil to puncture the pod.

The puncture mechanism can induce motion in multiple components in different directions based on a single rotational input. For example, using a rotating cam driver, the puncture mechanism can induce lateral movement of one or more pod capture devices (e.g., sliding or pivotable locks) to secure the beverage pod, and the puncture mechanism can induce axial movement of the anvil and/or the beverage pod to puncture a seal of the pod.

In various embodiments, the puncture mechanism can include a single rotating cam driver, two cams, and two cam followers to induce motion in multiple components to secure and puncture the beverage pod. The cam driver can be propelled via a motor or a manual mechanism, for example. As the cam driver rotates, first cams can move along respective cam paths to cause the sliding or pivotable locks to move toward a stationary beverage pod. At the end of their travel, the locks can engage the beverage pod, such as by protruding into castellations in the pod cap. Once engaged, the locks can capture (e.g., securely hold) the beverage pod. As the cam driver continues to rotate, the first cams can move through a dwell section of their respective cam paths, thus inducing no motion. Simultaneously, second cams, which can be cam surfaces defining respective cam paths in the cam driver itself, can initially move through a dwell section and thus induce no motion to a second cam follower (e.g., a carrier ring). After the dwell section, the second cams can translate the carrier ring, which can carry the anvil toward and into contact with the pod, or can carry the pod toward and into contact with the anvil. The translation of the carrier ring, and the anvil or the pod, can continue until the anvil causes the pod seal to be punctured via a needle attached to the cap of the pod. The cam driver can be rotated in the opposite direction to reverse the motion of the carrier ring and the movable locks, thereby allowing the user to remove the punctured beverage pod after use and insert a new pod into the receiving cavity of the dispensing station.

Figure 17:
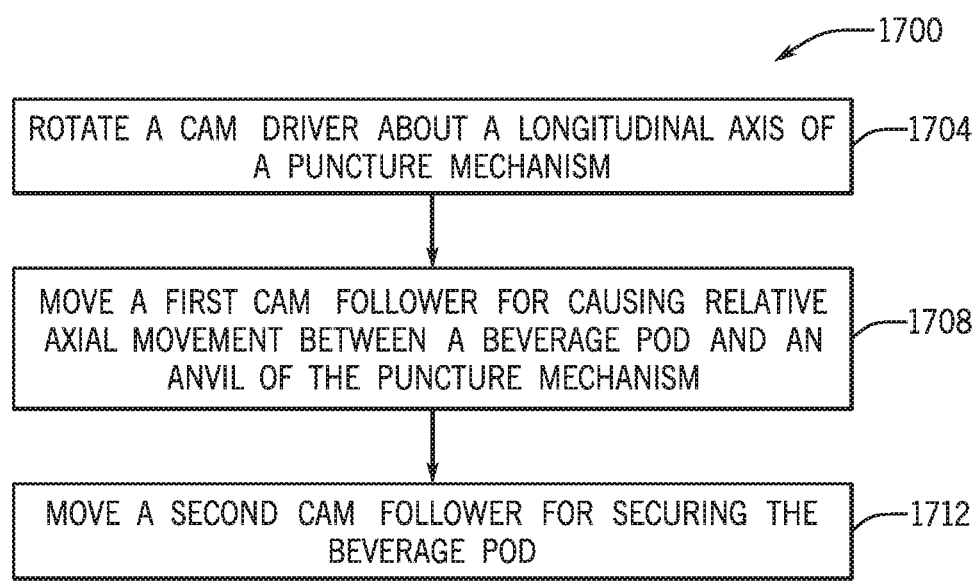
FIG. 17 is a flow chart of a method for puncturing a seal in a beverage pod in a beverage machine.

To facilitate the reader's understanding of the various functionalities of the embodiments discussed herein, reference is now made to the flow diagram in FIG. 17, which illustrates process 1700. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 17, process 1700 relates generally to a process for puncturing a seal in a beverage pod using a beverage machine. The process 1700 may be used with any of the beverage machine, appliances, and beverage containers described herein, for example, such as the beverage machine 100 and/or beverage containers of pods 112, including variations and combinations thereof.

At operation 1704, a cam can be rotated about a longitudinal axis of a puncture mechanism. For example and with reference to FIG. 14A, the cam drive 230 can be rotated about the longitudinal axis 140 of the puncture mechanism 110. For example, a motor or other electromechanical element can be initiated upon receipt of the pod 112 within the puncture mechanism 110. The motor can therefore be used to rotate the cam driver 230. In response to the rotation, the puncture mechanism 110 can engaged the pod 112, helping secure a pod during opening, and cause relative axial movement of an anvil to facilitate opening the pod and release of beverage medium container therein.

In this regard, at operation 1708, in response to the movement of operation 1704, a first cam follower can be moved for causing relative axial movement between a beverage pod and an anvil of the puncture mechanism. For example, and with reference to FIGS. 14A and 14B, as the cam driver 230 is rotated, the axial ring 206 can be axially translated. Specifically, the axial ring 206 can move along or parallel to the longitudinal axis 140. In turn, this axial movement can cause the anvil 136 to similarly move along the longitudinal axis 140 and toward the pod 112. In some cases, as shown in FIG. 14B, the anvil 136 can engage a rolling diaphragm 144 of the pod 112 to facilitate release of beverage medium within the pod 112.

The movement described with respect to the operation 1704 can also be used to engage the pod 112, helping secure the pod within the puncture mechanism 110 during use. For example, at operation 1712, in response to the movement of operation 1704, a second cam follower can move for securing a beverage pod. For example and with reference to FIGS. 13-14B, as the cam driver 230 is rotated, one or more sliding locks 170 can move substantially toward the pod 112. In some cases, the sliding locks 170 can move toward the pod 112 and engage an exterior surface of the pod 112, helping mitigate sliding of the pod 112 from the puncture mechanism 110.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts can be otherwise variously embodied and employed, and the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure can be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order, and relative sizes reflected in the drawings attached hereto can vary.

What is claimed is:

1. A puncture mechanism for a beverage machine, comprising:
    a cam driver defining a first cam and a second cam;
    a first cam follower associated with the first cam and configured to move in an axial direction in response to rotation of the first cam about a longitudinal axis, wherein movement of the first cam follower in the axial direction causes relative axial movement between an anvil and a beverage pod; and
    a second cam follower associated with the second cam and configured to move along a linear path transverse to the longitudinal axis in response to the rotation of the second cam about the longitudinal axis, wherein movement of the second cam follower along the linear path causes engagement between a sliding lock and a beverage pod;
    wherein, upon actuation of the cam driver, the first cam and the second cam rotate with one another about the longitudinal axis.

2. The puncture mechanism of claim 1, wherein the cam driver is configured to cause rotation of the first cam and the second cam in response to a single rotational input.

3. The puncture mechanism of claim 2, further comprising a motor coupled to the cam driver by a gear configured to provide the single rotation input and rotate the cam driver about a longitudinal axis of the puncture mechanism.

4. The puncture mechanism of claim 1, wherein the first cam comprises a cam path defined by the cam driver.

5. The puncture mechanism of claim 4, wherein the cam path is defined along a circumferential wall and extending axially to define a ramp section along the circumferential wall.

6. The puncture mechanism of claim 5, wherein the cam path further includes a dwell section configured to cause no axial movement of the first cam follower, and the ramp section is configured to cause axial movement of the first cam follower.

7. The puncture mechanism of claim 1, wherein the second cam comprises a shaft.

8. The puncture mechanism of claim 7, wherein:
the sliding lock defines the second cam follower; and
the shaft is arranged within the second cam follower.

9. The puncture mechanism of claim 1, wherein the first cam follower is arranged at a rotationally fixed position about a longitudinal axis of the puncture mechanism.

10. The puncture mechanism of claim 1, wherein the first cam follower comprises a carrier ring including a radially-extending pin that interacts with the first cam path.

11. A puncture mechanism for a beverage machine, comprising:
a cam driver that is rotatable about a longitudinal axis of the puncture mechanism;
first and second cams defined by the cam driver; and
first and second cam followers associated with the first and second cams, respectively, the first cam configured to cause the first cam follower to move axially along the longitudinal axis of the puncture mechanism, the second cam configured to cause the second cam follower to move along a linear path transverse to the longitudinal axis of the puncture mechanism, wherein the first cam and second cam are positionally fixed relative to one another on the cam driver.

12. The puncture mechanism of claim 11, wherein:
the first cam comprises a cam path defined in a sidewall of the cam driver; and
the first cam follower comprises a carrier ring including a radially-extending pin received in the cam path.

13. The puncture mechanism of claim 12, wherein:
the second cam comprises a cam surface defined by the cam driver; and
the second cam follower comprises at least two movable locks that are moved by the cam surface between a first position in which the locks are retracted from the longitudinal axis and a second position in which the locks are extended toward the longitudinal axis.

14. The puncture mechanism of claim 13, wherein the cam surface is defined by a shaft extending through a track defined by the cam follower.

15. A method of puncturing a seal in a beverage pod in a beverage machine using a puncture mechanism, the method comprising:
rotating a cam driver about a longitudinal axis of the puncture mechanism; and
in response to rotating the cam driver:
moving a first cam follower, associated with a first cam defined by the cam driver, axially along the longitudinal axis and causing relative axial movement between the beverage pod and an anvil of the puncture mechanism; and
moving a second cam follower, associated with a second cam defined by the cam driver, along a linear path transverse to the longitudinal axis and causing the second cam follower to engage the beverage pod and restrict axial movement of the beverage pod relative to the second cam follower,
wherein the first cam and second cam are positionally fixed relative to one another on the cam driver.

16. The method of claim 15, wherein the operation of moving a first cam follower comprises releasing beverage medium from the beverage pod using the relative axial movement between the beverage pod and the anvil of the puncture mechanism.

17. The method of claim 15, wherein the operation of rotating comprises rotating the cam driver using a motor coupled to the cam driver by a gear.

18. The method of claim 15, further comprising further rotating the cam drive about the longitudinal axis for release of the beverage pod from the second cam follower.

* * * * *